US009619706B2

(12) United States Patent
Scott

(10) Patent No.: US 9,619,706 B2
(45) Date of Patent: Apr. 11, 2017

(54) SECURITY SCHEME FOR AUTHENTICATING OBJECT ORIGINS

(71) Applicant: Enceladus IP Holdings, LLC, McLean, VA (US)

(72) Inventor: Wallace Penn Scott, Clarksville, TN (US)

(73) Assignee: Enceladus IP Holdings LLC, McLean, VA (US)

( * ) Notice: Subject to any disclaimer, the term of this patent is extended or adjusted under 35 U.S.C. 154(b) by 203 days.

(21) Appl. No.: 14/296,002

(22) Filed: Jun. 4, 2014

(65) Prior Publication Data

US 2015/0278598 A1    Oct. 1, 2015

Related U.S. Application Data

(60) Provisional application No. 61/971,880, filed on Mar. 28, 2014.

(51) Int. Cl.
  *G06K 9/00*   (2006.01)
  *G06F 7/04*   (2006.01)
  (Continued)

(52) U.S. Cl.
  CPC ......... *G06K 9/00577* (2013.01); *G06F 21/10* (2013.01); *G06K 19/086* (2013.01);
  (Continued)

(58) Field of Classification Search
  None
  See application file for complete search history.

(56) References Cited

U.S. PATENT DOCUMENTS 8,387,889 B2    3/2013  Lapstun et al.
2001/0046294 A1   11/2001  Bandy et al.
(Continued)

FOREIGN PATENT DOCUMENTS

GB   2342743 A   4/2000
WO   0115097 A1  3/2001
(Continued)

OTHER PUBLICATIONS

Extended European Search Report issued in EP Application No. 15161475.7, dated Aug. 19, 2015, 7 pages.
(Continued)

*Primary Examiner* — Matthew Bella
*Assistant Examiner* — Jose M Torres
(74) *Attorney, Agent, or Firm* — Brake Hughes Bellermann LLP

(57) ABSTRACT

Systems and methods use an origin pattern to verify the authenticity of a host object. The origin pattern includes a text-based serial number and a computer-graphics based surface-texture component. The serial number includes a public manufacturer identifier and an object identifier sequence that is based on a hash of a private manufacturer identifier and a private object identifier. The surface-texture component includes a two dimensional texture mapped onto a three dimensional surface, the generation of the surface being based on the hash. In response to an authentication request for an origin pair, the system may verify the serial number component exists in a data store and generate a challenge surface-texture component based on data in the data store. If the challenge surface-texture component matches, the system may use a time-location stamp to determine an authenticity probability and provide an indication of authenticity in response to the verification request.

20 Claims, 17 Drawing Sheets

(51) Int. Cl.
  *H04N 7/16* (2011.01)
  *G06F 21/10* (2013.01)
  *G06K 19/08* (2006.01)
  *G09C 5/00* (2006.01)
  *H04L 9/32* (2006.01)

(52) U.S. Cl.
  CPC .............. *G09C 5/00* (2013.01); *H04L 9/3226* (2013.01); *H04L 9/3239* (2013.01); *G06K 2009/0059* (2013.01)

(56) References Cited

U.S. PATENT DOCUMENTS

| | | | |
|---|---|---|---|
| 2007/0152033 A1* | 7/2007 | Hind .................... | G06Q 20/367 235/376 |
| 2007/0180248 A1 | 8/2007 | Gorostidi et al. | |
| 2007/0219916 A1 | 9/2007 | Lucas | |
| 2008/0011841 A1* | 1/2008 | Self ........................ | G06Q 30/06 235/385 |
| 2009/0169019 A1* | 7/2009 | Bauchot ................. | G06F 21/10 380/278 |
| 2010/0033300 A1* | 2/2010 | Brandin ................. | G06F 21/31 340/5.8 |
| 2012/0041887 A1 | 2/2012 | Hurme et al. | |
| 2012/0069992 A1 | 3/2012 | Jozwiak et al. | |
| 2012/0273564 A1 | 11/2012 | Mercolino et al. | |
| 2013/0170758 A1 | 7/2013 | G | |
| 2013/0173484 A1 | 7/2013 | Wesby | |
| 2014/0067699 A1* | 3/2014 | Volchek ............. | G06K 17/0022 705/317 |
| 2014/0252077 A1* | 9/2014 | Corby ..................... | G06K 5/00 235/375 |
| 2015/0235235 A1* | 8/2015 | Koren ................ | G06Q 30/0185 705/318 |
| 2015/0269570 A1* | 9/2015 | Phan .................. | G06Q 20/3276 705/71 |
| 2015/0278487 A1 | 10/2015 | Scott | |

FOREIGN PATENT DOCUMENTS

| | | |
|---|---|---|
| WO | 2008147422 A1 | 12/2008 |
| WO | 2009013078 A1 | 1/2009 |

OTHER PUBLICATIONS

Extended European Search Report issued in EP Application No. 15161472.4, dated Aug. 19, 2015, 7 pages.

Baskin, "What Happens When 3D Printing Turns Consumer Products Into Digital Content?", retrieved from http://www.forbes.com/sites/jonathansalembaskin/2014/03/06/what-happens-when-3d-printing-turns-consumer-products-into-digital-content/, Mar. 6, 2014, 4 pages.

"Primer: 3D printing, Early days for a disruptive space", Technology Supply Chain, Bank of America Merrill Lynch, Sep. 23, 2013, 104 pages.

Chui et al. "The Internet of Things" Insights & Publications, McKinsey & Company, retrieved from http://www.mckinsey.com/insights/high_tech_telecoms_internet/the_internet_of_things, Mar. 2010, 5 pages.

"3D Printing: Rewriting Global Manufacturing", Citi Research, Apr. 11, 2013, 20 pages.

"Secure Hash Standard", Federal Information Processing Standards Publication 180-4, Information Technology Laboratory, National Institute of Standards and Technology, Mar. 2012, 37 pages.

* cited by examiner

SECURITY SCHEME FOR AUTHENTICATING OBJECT ORIGINS

RELATED APPLICATION

This application claims priority under 35 U.S.C. §119 to Provisional Patent Application Ser. No. 61/971,880, entitled "SECURITY SCHEME FOR AUTHENTICATING PRODUCT ORIGINS" filed on Mar. 28, 2014. The subject matter of this earlier filed application is hereby incorporated by reference.

TECHNICAL FIELD

The subject matter of the present disclosure relates to a security scheme for authenticating the origins of an object.

BACKGROUND

Counterfeit goods siphon off a massive 6% of global GDP each year, according to the International Chamber of Commerce. Not only does this 'object piracy' threaten the profits of entire industries, but it may also endanger the safety of consumers who are often unaware of their products' inauthenticity. Technologies currently used in attempts to protect against counterfeiting include holograms, chemical forensics, Radio-Frequency Identification, and moiré ink patterns, etc. While these measures work well in certain applications, they are expensive to generate and require special training or equipment for verification. Additive manufacturing, or 3D printing, is an emerging technology that enables production of products from a digital blueprint, but also has the unintended effect of enabling counterfeiters to replicate certain products more easily than ever before. 3D scanning technology can recreate virtual models from scanned physical objects with as few as a handful of camera pictures. Those virtual models can be 3D printed with minimal or no effort, and few rules are in place yet to prevent intellectual property infringement through this process.

SUMMARY

Systems and methods described here provide authentication for the origin of products using an origin pattern provided on the surface of the product. The origin pattern, also referred to as a Pollux Pair, includes a serial number component and a surface-texture component, each portion being cryptographically generated prior to being imprinted, etched, or otherwise affixed to the object. This concept on an abstract level is similar to that of a cryptographic challenge pair, although disclosed implementations involve the transformation of computer graphics objects to derive the origin pattern. An object bearing the origin pattern product may be verified using a mobile smartphone application. The origin pattern may serve as a proof-of-origin from not only a single manufacturer, but may also be used to verify a chain of ownership linking the original manufacturer to other authorized designers, suppliers, fabricators, etc., involved in the object's creation, if any.

Verification of an origin pattern's authenticity, and therefore its host object's authenticity, may be accomplished using a verification application installed on a mobile client, such as a smartphone or tablet, and an internet connection. A verification exchange between a centralized authentication server and mobile (i.e., decentralized) clients creates a semi-distributed verification network that makes counterfeiting of origin pattern protected objects increasingly difficult as time passes.

For the intellectual property holder, benefits of using disclosed implementations include: lowered resource expenditure on product inspection and verification, little or no cost to generate and affix Pollux Pairs, and protection in the face of advanced manufacturing processes' unintended lowering of counterfeiting entry barriers. For the consumer, benefits of using disclosed implementations include: the empowerment to verify a product's authenticity for personal surety and safety, no cost to download or operate the mobile verification application, and reward incentives provided by the system provider and/or the intellectual property holder for strengthening the semi-distributed authentication network.

The details of one or more implementations are set forth in the accompanying drawings and the description below. Other features will be apparent from the description and drawings, and from the claims.

DETAILED DESCRIPTION

Implementations include systems and methods that use a unique combination of concepts and tools found in differential geometry, cryptography, Computer-Assisted Design, and smartphone applications, to allow manufacturers, such as OEMs, design firms, supply chain partners, etc., to protect their products and guarantee product quality to consumers. Implementations achieve protection through generating a unique origin pattern in the form of a computer graphics-driven cryptographic challenge pair, or fingerprint, for each manufactured part. The origin pattern includes a serial number component and a surface-texture component. The surface-texture component may be a 2D or 3D texture while the serial number component is text or character-based, but may appear in the form of a bar code. The origin pattern is instantly verifiable using an application on a mobile device that, in combination with a central authentication processor, provides a semi-distributed verification system. Because the surface-texture component may be cryptographically derived from the serial number component, the origin pattern is un-forgeable yet is easily laser-etched, 3D printed, or otherwise imprinted onto its host object—providing both the benefits of security and low implementation expense. This origin pattern, also referred to as a Pollux Pair, is plainly visible to the naked eye on the host object, making verification possible using a free-of-charge application and a mobile device with a camera. Thus, a professional or a consumer inspector can quickly determine whether the object being inspected is authentic or pirated.

Another notable feature of the origin pattern is its ease-of-manufacturability. It can be laser etched, 3D printed, or ink printed onto its host product using tools that are already in common use, as opposed to more complex proof-of-origin solutions, such as holograms, chemical forensics, Radio-Frequency Identification, and moiré ink patterns.

Figure 1:
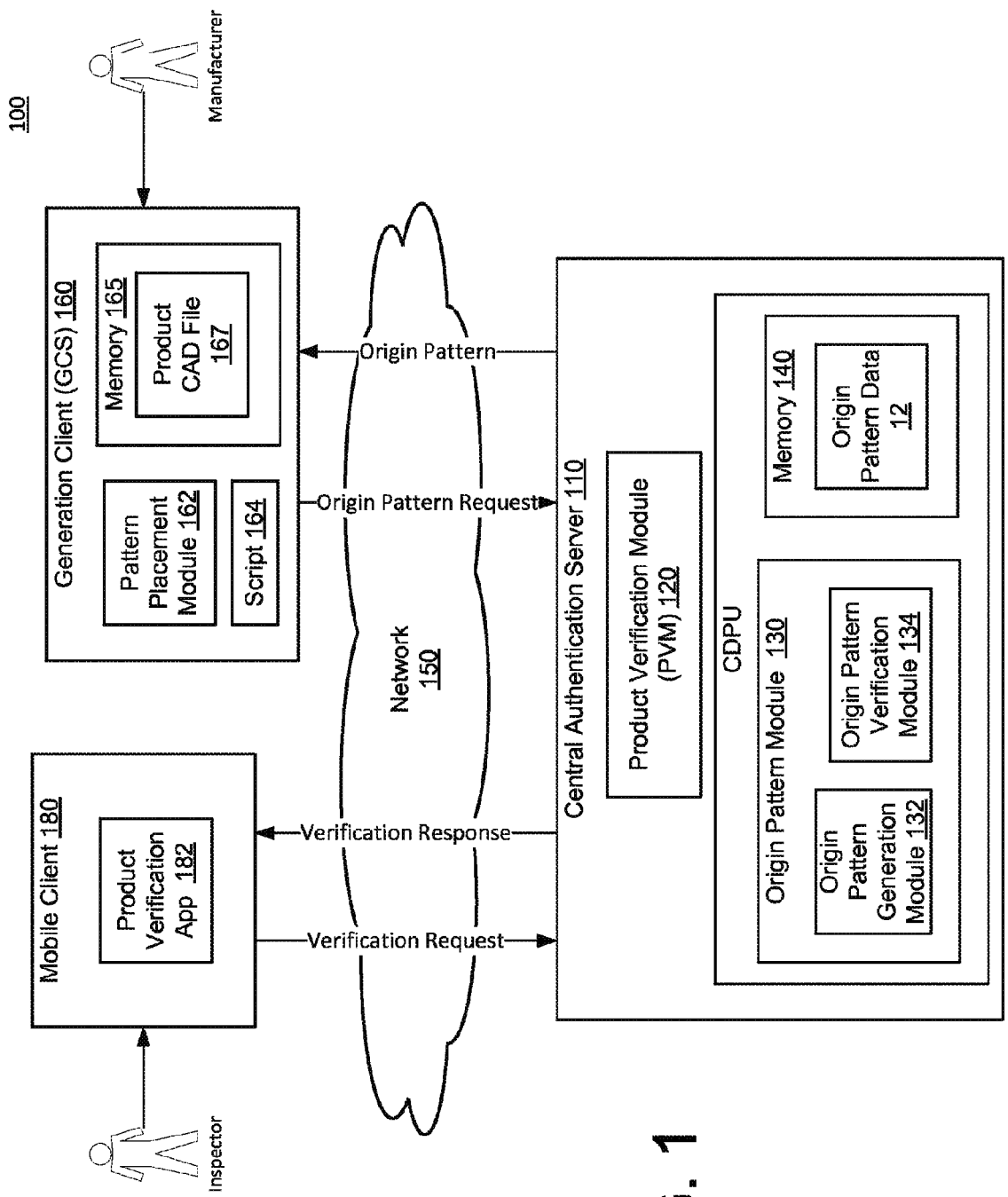
FIG. 1 is a block diagram that illustrates an example of a product authentication system, in accordance with disclosed implementations.

FIG. 1 illustrates an example block diagram of a product authentication system, in accordance with disclosed implementations. The object authentication system 100 can be embodied, for example, on one or more computing devices, such as central authentication server 110, mobile client 180, and generation client (GCS) 160. Central authentication server 110 may be a mainframe, a server, a group of servers, a rack system, networked personal computers, etc. The central authentication server 110 may be a combination of two or more computing devices. For example, two or more computing devices may be physically or logically distinct from each other but in communication with each other via a communications network (not shown in FIG. 1), operating as central authentication server 110. The central authentication server 110 may be accessible to other computing devices via a network 150, such as the Internet.

The system 100 may also include a generation client (GCS) 160. The generation client 160 may be a personal computer, a laptop, a desktop, a tablet, a television with a processor, a server, a group of servers, etc., used by a manufacturer. The generation client 160 may also include a combination of one or more computing devices. In some implementations, the generation client 160 may be a cloud-based computing system accessible by a manufacturer over a network, or may be installed on one or more computing devices physically located with the manufacturer.

The system 100 may also include a mobile client 180. The mobile client may be a smart phone, a tablet, a laptop, or any mobile device that includes a camera and capability to connect to the central authentication server 110 (e.g., via the Internet, WiFi, or cellular data plan). The mobile client 180 may be used by an inspector, for example a consumer, customs official, auditor, etc., at a location where an object imprinted with an origin pattern is located.

Figure 2:
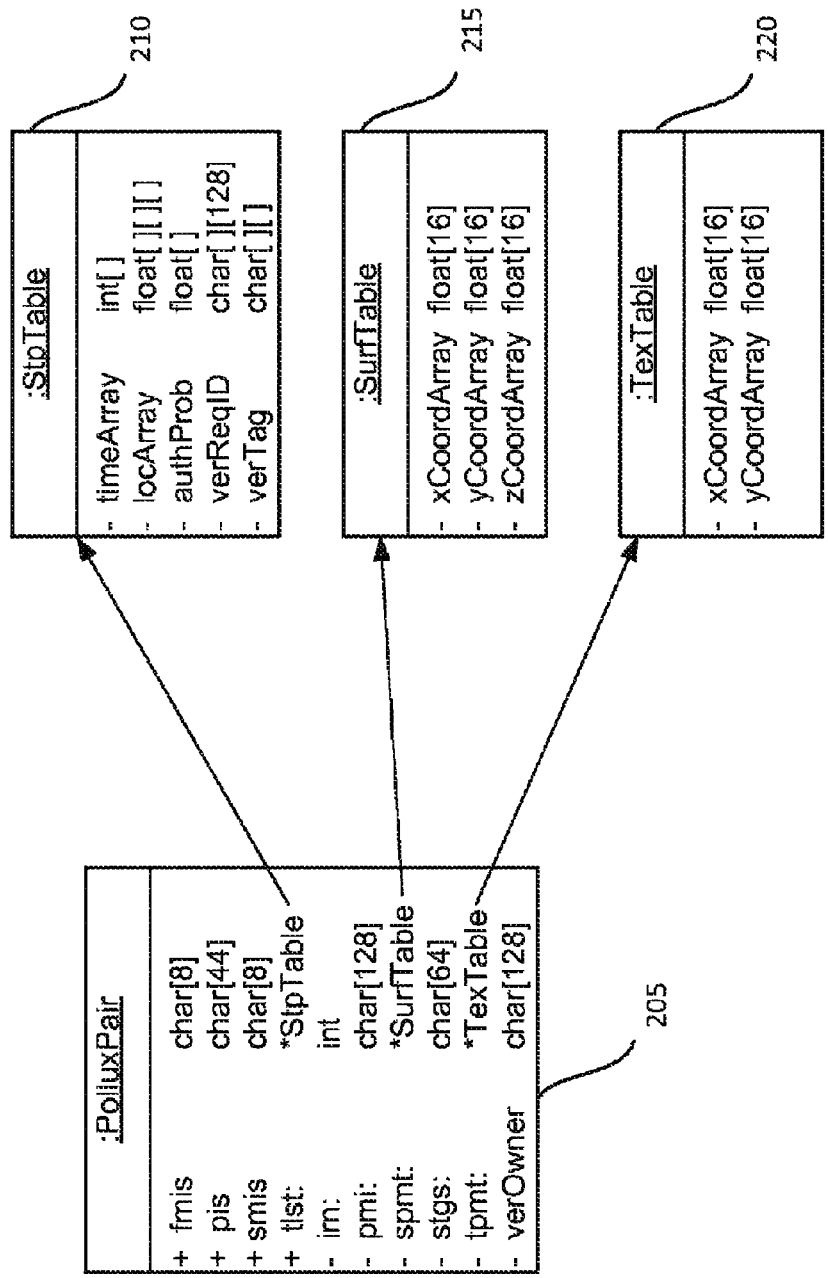
FIG. 2 is an example data diagram that illustrates an example of origin pattern data used in authenticating products, in accordance with disclosed implementations.

The central authentication server 110 may include a Product Verification Module (PVM) 120 and a Central Database and Processor Unit (CDPU). The CDPU may send and receive information only through the PVM 120. The CDPU may include Origin Pattern Modules 130 and memory 140, which stores several categories of information for each Pollux Pair, as illustrated in FIG. 2.

To protect an object, such as a part, product, or other article of manufacture, a manufacturer may install and/or access the generation client 160. The generation client 160 may allow the manufacturer to register, thus receiving an identifier, and begin to generate an origin pattern for products. The generation client 160 may include two parts; an interactive GUI, e.g., the pattern placement module 162, that allows the manufacturer to pick the origin pattern's placement on the host object, and an automated script 164 for requesting and returning origin patterns from the PVM 120.

The pattern placement module 162 may allow a manufacturer to import a smart CAD file 167 of the host object, typically a format such as IGES or STEP. The pattern placement module 162 may also include a sample origin pattern for the client to place on the host object. In some implementations, the pattern placement module 162 may generate zones that cover the smart object, denoting areas where an origin pattern can or cannot be placed due to limitations on the underlying host object's surface curvature. The zones may be visibly denoted with coloration or shading, for example appearing either green (where an origin pattern can be placed) or red (where the origin pattern cannot be placed). The position, orientation, and scale of the origin pattern can be manually specified by the manufacturer, using the sample origin pattern to provide a good indicator of the host object's final appearance. Once a position, orientation, and scale have been selected, the client 160 may send a generation request to the PVM. To protect the CDPU from outside attack, the PVM 120 may verify it has received a valid request (e.g., the signature on the encrypted file can have originated only from a registered manufacturer) before passing the generation request on to the CDPU. The CDPU then receives the generation request and creates an origin pattern (i.e., a Pollux Pair). In some implementations, the origin pattern may be generated by an origin pattern generation module 132. The newly-generated origin pattern is time-location stamped, and this stamp may serve as the first entry to this particular origin pattern's time-location stamp table (or TLST), as described in FIG. 2. The CDPU may add additional entries to the TLST, for example via origin pattern verification module 134, in response to later verification requests.

Depending on how the manufacturer wishes to display the origin pattern on the host object, the GCS may offer to perform the added step of imprinting the origin pattern into the smart CAD file 167. This step would presumably occur when the object is to be 3D-Printed, and may be achieved by arranging the origin pattern in very close proximity to the object (by matching the origin pattern centroid to the centroid of the object's imprinted area) and projecting the origin pattern to the surface along the normal surface vector direction. The generation client 160 then makes an extruded cut of the origin pattern into the surface along the average surface normal vector of the imprinted area (note that this vector is constant and uniform across the entire extrusion). Afterward, the origin pattern-imprinted host object may be exported as a tessellated file for fabrication. In some implementations, the generation client 160 may disallow exporting the smart CAD file 167 with the origin pattern affixed, as counterfeits produced from this file may not be detectable. In other words the Pollux Pair could be extracted from the file and affixed to an entirely different object, perhaps without the manufacturer's knowledge.

If the manufacturer wishes to laser-etch, ink-print, or imprint an origin pattern by some other method, the generation client 160 may also simply provide the manufacturer with a high-resolution bitmap image. In some implementations, the generation client 160 may time stamp the origin pattern (e.g., the bitmap image), in order to thoroughly document the lifecycle of the origin pattern.

FIG. 2 is an example data diagram that illustrates an example of origin pattern data 12 that can be used in authenticating objects, in accordance with disclosed implementations. Each Pollux Pair data 205 in the CDPU may include the illustrated variables used to generate and verify a Pollux Pair. It is understood that the format, names, and variables of FIG. 2 are one example only and implementations include other data layouts not illustrated that also include data used for generation and verification of a Pollux Pair. As illustrated, some variables may point to other objects for increased processing efficiency, but it is understood that use of pointers is not required.

The data 205 for a Pollux Pair object may include a private or secret 128-character string called a Private Manufacturer Identifier (PMI). The PMI may be thought of as a 128-character password that provides ownership access to all of a manufacturer's products. Thus, each manufacturer, whether an original manufacturer or one in the chain of ownership, has a unique PMI. The PMI may be generated when a manufacturer registers using the generation client 160. The data 205 for a Pollux Pair object may also include a public manufacturer identifier, also known as a First Manufacturer Identifier Sequence (FMIS). The FMIS is a public identifier of the manufacturer, and is thus the public counterpart to the private PMI. Like the PMI, the FMIS is unique to a manufacturer, but may be printed in readable format on the product or part. The data 205 for a Pollux Pair object may also include a chain of ownership identifier, also known as the Second Manufacturer Identifier Sequence (SMIS). The SMIS is the public identifier of the previous manufacturer in the chain of ownership. Thus, the SMIS is null if the manufacturer is the original manufacturer. If the original manufacturer authorizes a second manufacturer to produce a part, the second manufacturer may use the FMIS of the original manufacturer as the SMIS when the second manufacturer produces the object.

Figure 18:
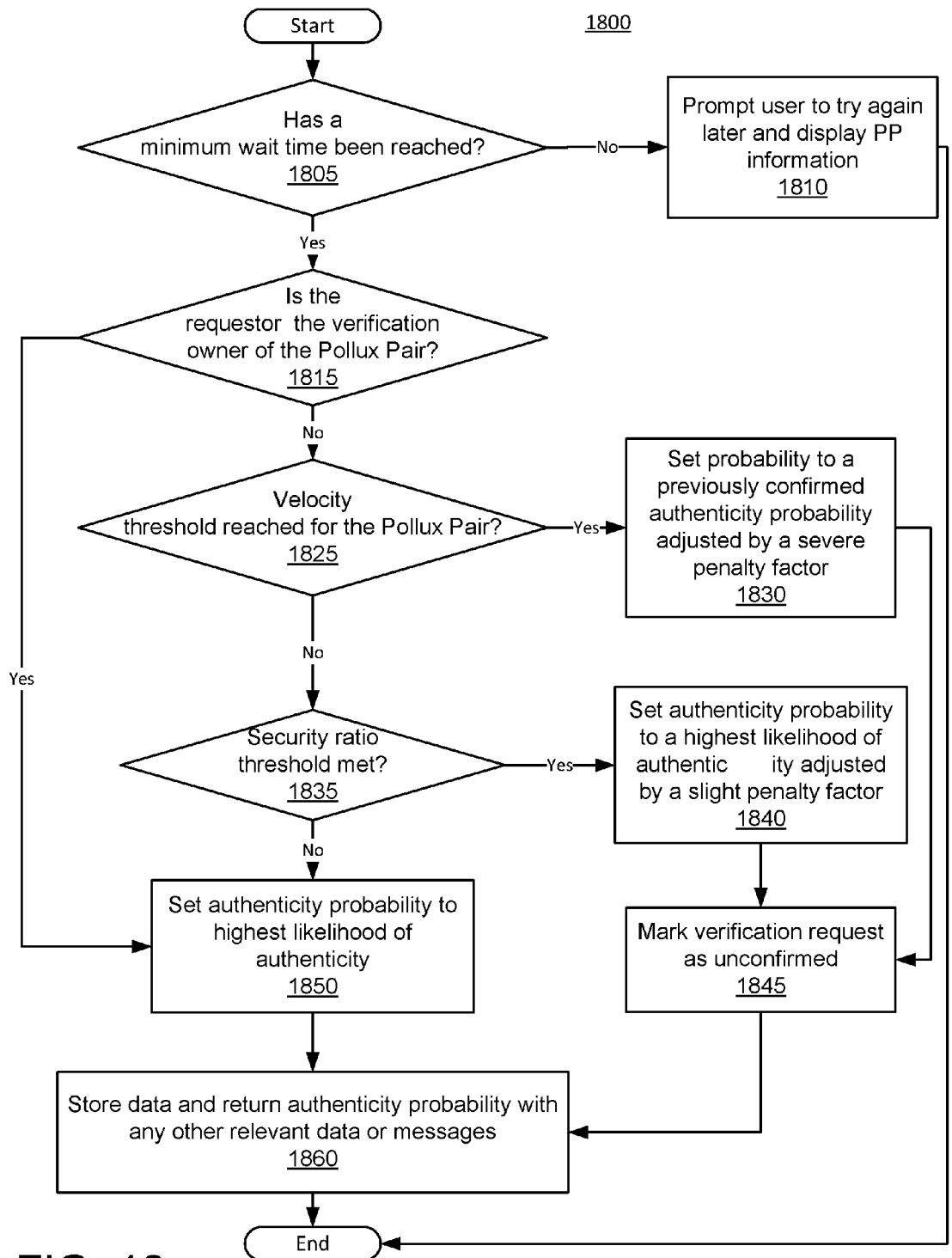
FIG. 18 is a flow diagram of an example process for determining an authenticity probability of an object with an affixed origin pattern, in accordance with disclosed implementations.

The data 205 for a Pollux Pair object may also include a 128-character verification owner identifier, verOwner, which provides a particular verification requestor the authority to bypass the probabilistic authentication, described with regard to FIG. 18 herein, if that requestor is the verification owner of that Pollux Pair-affixed product. In a sense, that user becomes the last link in the Pollux Pair's chain of ownership, although the user's privileges extend only to verification requests and not to intellectual property ownership of the object. The verification owner identifier can be updated upon the consent of the previous verOwner or the First Manufacturer (e.g. the owner of the FMIS), and may occur during commercial transactions.

The data 205 for a Pollux Pair may also include an IRN, or Incremented Reference Number. The IRN may be an identifier for each part or for each host part (e.g., each instance of a part), depending on the implementation. In some implementations the IRN may be a Base-10 serial number to differentiate between multiple instances of the same product design. For example, the IRN may be incremented when an original manufacturer authorizes another to manufacture the same part or when a change is made to the part. In some implementations, the IRN may be incremented for each instance of a product.

The data 205 for a Pollux Pair may also include a Surface-Texture Generation Sequence (or STGS). The system may generate the STGS by appending the IRN and SMIS to the PMI and hashing the resultant string. The data 205 for a Pollux Pair may also include a Product Identifier Sequence (PIS). The Product Identifier Sequence may be an identifier for the specific Pollux Pair, and may be generated by appending the (public) First Manufacturer Identifier Sequence to the (private) Surface-Texture Generation Sequence (STGS) and hashing the resultant string.

The Time-Location Stamp Table 210 (TLST) for each Pollux Pair may contain private member variables, as well as accessor and mutator functions for each variable, although these are not shown. Because a Pollux Pair may, and often should, have multiple time-location stamp entries in the Table 210, the Table 210 may include a new entry for each new legitimate verification request. The Table 210 may also include an entry generated at the time the Pollux Pair is generated. The first variable of the TLST may be a time array (timeArray), which tracks the time of each verification request. In some implementations, the time array may be an integer array denoting the number of seconds passed since a known time, for example, 12:00 pm January 1st, 1970, upon the event of a verification request. Each entry in the integer array may represent one verification request (or the original entry generated when the Pollux Pair was generated). The second variable of the TLST may record the latitudinal and longitudinal coordinates of one verification request. In some implementations, the coordinates may be tracked using a 3D array of floating point numbers, e.g. locArray. Additionally, each TLST entry may include a probability of authenticity (authProb) that denotes the likelihood that a verification request may be valid or invalid. In some implementations, the float values may be constrained between a range of values, such as between 1.00 and 0.00 where 1.00 is the highest likelihood and 0.00 is no likelihood. The TLST 210 may record both the time and location of a verification request for an origin pattern that, if valid, gives the location of that origin pattern's host object at the time of verification. Each entry in the TLST is assigned an authenticity probability, or a likelihood that the host object has an authentic origin pattern, to assist the CDPU's decision-making in the event of a possible conflict in the entries. Accordingly, this probability can be used to detect fraudulently copied objects, as will be explained herein.

The Time-Location Stamp Table 210 for a Pollux Pair may also include a list of verification requestor identifications, or verReqID, entries. The verReqID may track the unique verification requestors throughout that Pollux Pair's lifetime. In some implementations, the verification requestor identifications may be derived for each incoming verification request, and can be either null or a 128-character requestor identification sequence. If the verification requestor identification of a verification request matches the verification owner identifier of the current Pollux Pair, the system may bypass a probabilistic authentication test. The inclusion of the verification requestor identifier within the TLST provides the central authentication server with the ability to reconstruct the consumer-side chain of ownership, if necessary.

The Time-Location Stamp Table 210 for a Pollux Pair may also include a verification tag (verTag). The verification tag may be a string of characters added by an inspector that corresponds with an entry in the Time-Location Stamp Table. This may serve many purposes at the discretion of the inspector, such as adding tracking data to a Pollux Pair or embedding a secret lottery-winner ticket during a manufacturer-sponsored contest to incentivize consumers to inspect its products and enforce its anti-counterfeiting network. The verification tag for a verification request is accessible through mutator and accessor functions in a manner similar to the other data contained within the TLST, and if such a tag is to be created, it can be done concurrently with the verification request. In other words, if the verification is successful, the system may add data in the verification tag, which can represent a lottery ticket number, tracking data, etc.

The Surface Parameter Mapping Table 215 and Texture Parameter Mapping Table 220 both may include arrays of random floating point numbers for each possible hexadecimal character input, e.g., each control vertex. The system may populate the arrays with random numbers upon creation of each instance of the table, and those numbers will remain constant for the origin pattern's lifespan. The floating point numbers of the SPMT 215 determine the eventual construction of the three dimensional surface used to generate the surface-texture component of the Pollux Pair. The floating point numbers of the TPMT 220 determine the eventual construction of a texture for the Pollux Pair's surface-texture component.

The system 100 may also include a mobile client 180. Once a Pollux Pair has been imprinted onto a host object, any inspector equipped with a smartphone or other mobile computing device can authenticate that object almost instantly and for free. The inspector can perform this verification by running a no-cost application 182 installed on the mobile client 180 provided by a developer of the central authentication server 110. The inspector may then hold the camera of the mobile client 180 in close proximity to the Pollux Pair. The application 182 may wait until a clear image of the Pollux Pair is in focus, and then examine the positions of distortion detection patterns, which may be provided with the Pollux Pair on the host object. In the event that the Pollux Pair is located on a curved surface or the camera is not held at a perfectly 'head on' orientation, the application may 're-distort' the Pollux Pair back into its original form.

If the distortion detection patterns are not present, or if any other component of the Pollux Pair is not present in its proper form, the individual may be prompted to try again. Only after a potentially valid Pollux Pair is present will the application send a verification request to the central authentication server, which prevents an attacker from spamming the security scheme by taking random pictures with no Pollux Pair present.

The application 182 may retrieve the serial number component from the Pollux Pair, temporarily store it, and time-location stamp the storage. The application 182 may send a verification request containing the serial number component and time-location stamp to the central authentication server 110, where the PVM 120 may apply verification tests to the Pollux Pair sent as part of the verification request. If the CDPU determines that the Pollux Pair is authentic, the central authentication server 110 may send a response back to the mobile client 180 indicating such. The mobile client 180 may also be notified if the Pollux Pair is not authentic. This may prevent the inspector from unknowingly purchasing or using an unauthorized copy of the object.

Figure 3:
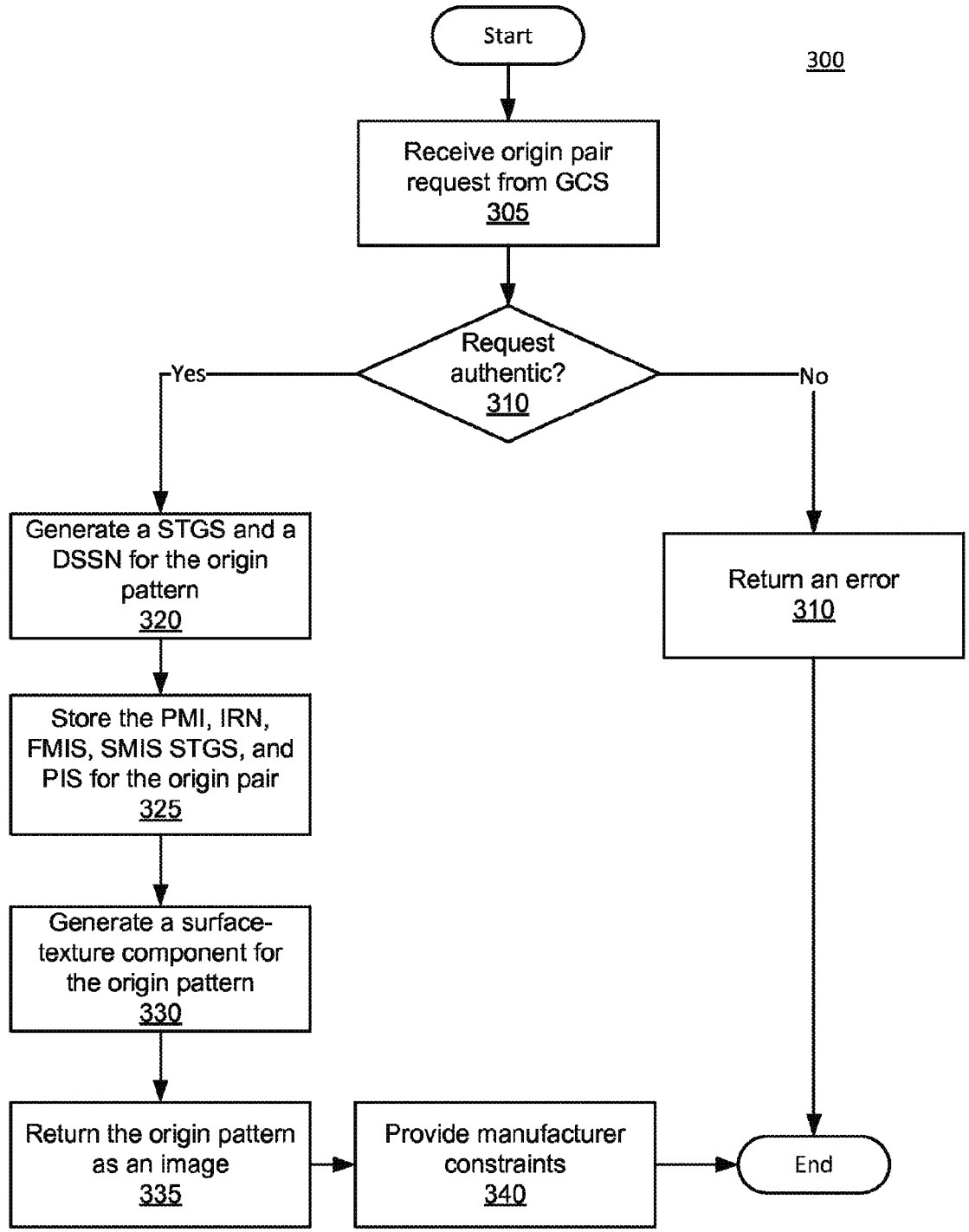
FIG. 3 is a flow diagram of an example process for generating an origin pattern, or Pollux Pair, in accordance with disclosed implementations.

FIG. 3 is a flow diagram of an example process 300 for generating an origin pattern, or Pollux Pair, in accordance with disclosed implementations. Process 300 may be performed by a central authentication server, such as central authentication server 110 of FIG. 1, to generate a new origin pattern. For example, when a manufacturer wants to apply an origin pattern on a new part, the manufacturer may use the generation client (e.g., GCS of FIG. 1) to request a new origin pattern for the new part or a new instance o the part, depending on the implementation. In some implementations, the manufacturer may request a new origin pattern for each object to be tracked.

Process 300 begins when the Central Processing Unit receives a request from the manufacturer, for example through the manufacturer client, for a new origin pattern (305). The request may include parameters including a private manufacturer identifier (PMI), a product identifier (IRN) the object, a public manufacturer identifier (FMIS) and a chain of ownership identifier (SMIS) that will correspond with the part. These identifiers may be provided by via a generation client, such as client 160 of FIG. 1. The request and its parameters may be communicated via an encrypted file. After receiving the request, the central authentication server may authenticate the request (310). In some implementations, the authentication may be performed by a trusted central client, such as PVM 120 of FIG. 1. The central authentication server may determine whether the request is authentic by determining whether the PMI in the request has been registered with the central authentication server. For example, the central authentication server may determine whether the PMI exists in a data store, such as in origin pattern data 12 of FIG. 1. In implementations where the request is encrypted, the central authentication server may also verify a signature on the encrypted file originated from a registered manufacturer. Of course, other methods of verifying that the request originated from a registered manufacturer may be used. If the request is not from a registered manufacturer (310, No), the central authentication server may return an error (315) indicating the request could not be authenticated and process 300 ends without generating an origin pattern. The authentication verification protects the central authentication server from unauthorized requests for origin patterns.

If the request is authenticated (310, Yes), the central authentication server may proceed to generate a Surface-Texture Generation Sequence (STGS) and a serial number or Digitally Signed Serial Number (DSSN) for the origin pattern (320). The generation of the STGS and DSSN may be performed, for example, by an origin pattern generation module, such as module 132 of FIG. 1. The STGS and DSSN are based on the other parameters supplied in with the request, as will be explained in more detail with regard to FIG. 4. The central authentication server may store the parameters provided in the request, the STGS, and the PIS, which is part of the serial number, in a data store (325) so that this information can subsequently be used to verify an origin pattern. The data may be stored, for example, in Pollux Pair data 205 of FIG. 2. The central authentication server may then generate a surface-texture component for the origin pattern (330). The surface-texture component is a cryptographic transformation, based on the STGS, of computer graphic objects, as will be explained in more detail below with regard to FIG. 6. The central authentication server may return the origin pattern, which includes the serial number and the surface-texture component to the requesting client (335). The origin pattern may be returned as an image file, either 2D or 3D depending on the request, that can be affixed to objects produced by the manufacturer. In some implementations, the system may optionally allow the manufacturer to provide constraints for the origin pattern (340). The constraints may limit the geographical area or time window where the origin pattern is valid. In some implementations, the constraints may be specified for a batch of origin patterns so that the manufacturer does not need to provide the constraints each time an origin pattern is generated. Process 300 then ends, having generated an origin pattern and the data used to verify the origin pattern at a later date.

Figure 4:
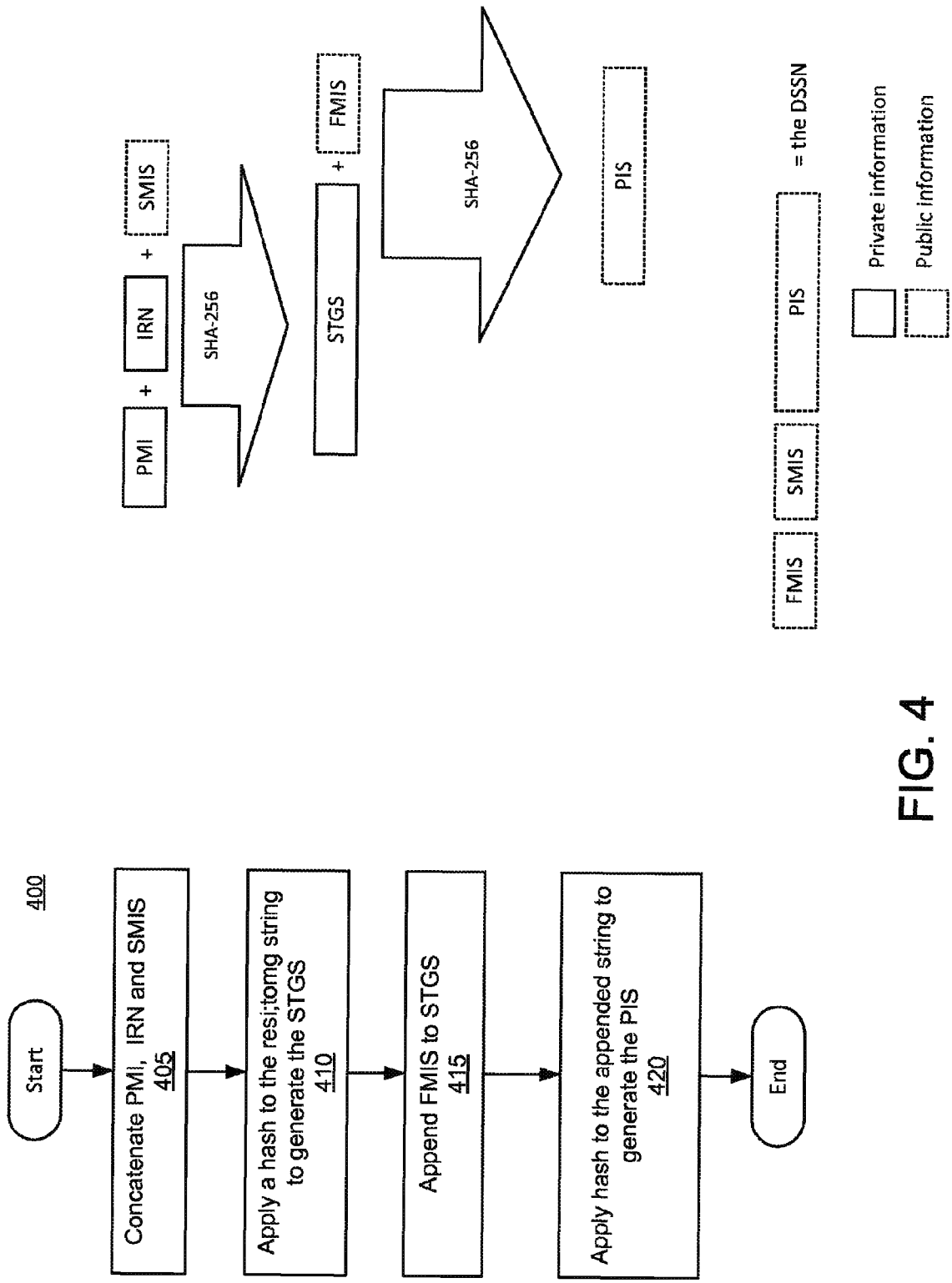
FIG. 4 is a flow diagram of an example process for generating a serial number component for an origin pattern, in accordance with disclosed implementations.

FIG. 4 is a flow diagram of an example process 400 for generating a serial number component of an origin pattern, in accordance with disclosed implementations. Process 400 may be performed by a central authentication server as part of step 320 of FIG. 3. In some implementations, process 400 may be performed by an origin pattern generation module. Process 400 may generate a private sequence, the STGS, used to generate a pseudo-randomized three-dimensional surface and a texture, and a public sequence, the DSSN, used to determine whether an origin pattern is authentic. The STGS and DSSN are each unique to each link in the chain of ownership for the part. Process 400 may begin by concatenating the PMI, IRN, and SMIS (405), which were provided as part of the generation request. The central authentication server may then apply a cryptographic hash function to the resulting string (410). For example, the Secure Hash Algorithm (specifically, the SHA-2 family) is a cryptographic function developed by the National Security Agency and both proprietary and open-source implementations of SHA-2 exist. One such example of open-source code available for SHA-2 is the PolarSSL code library. Applying the cryptographic hash function generates the STGS. In some implementations, the STGS may be a 64-character hexadecimal sequence, but implementations are not limited to 64-characters. The central authentication server may then concatenate the FMIS to the STGS that was just generated (415). The central authentication server may then apply the hash function to the resulting string to generate a product identifier sequence, or PIS (420). The PIS, when concatenated with the FMIS and SMIS make up the serial number, or DSSN, for the origin pattern. As illustrated in FIG. 4, the DSSN may be comprised of public information and imprinted on an object as a textual component of the origin pattern, which can be used to verify the authenticity of the surface-texture component. In some implementations, the serial number component may be printed as a bar code rather than as readable text.

The second component of the origin pattern (i.e., Pollux Pair) is the serial number. The serial number may function not just as a proof of origin from a particular manufacturer, but also if needed, as a proof of a chain of authorized ownership amongst multiple manufacturers. For example, the designer of a 3D-Printed part or product may want to produce copies of that part for one particular region, as well as authorize one or more other trusted producers to produce copies in other regions. The Pollux Pair is capable of building a fully transparent path of ownership using the Digitally Signed Serial Number (DSSN). As illustrated in FIG. 4, the DSSN may include three elements. The first element may be a First Manufacturer Identifier Sequence (FMIS). The FMIS is the public identifier of the manufacturer. Like the Private Manufacturer Identifier (PMI), the FMIS is unique to a manufacturer, but the FMIS is known to the public and may be printed in readable form on the object. In some implementations, the FMIS may be in Base 58, which is an alphanumeric sequence that can include any lowercase and uppercase letters and numbers 2 through 9, but omitting the characters '0', 'O', '1', and 'l' to avoid any reading confusion. In some implementations, the FMIS may be 8 characters long. Of course, it is understood that a longer or shorter FMIS may be used.

The second element in a DSSN is the Second Manufacturer Identifier Sequence (SMIS). The SMIS is the public identifier of the previous manufacturer in the chain of ownership. Thus, the SMIS is null if the manufacturer is the original manufacturer. If the original manufacturer authorizes a second manufacturer to produce a part, the second manufacturer may use the FMIS of the original manufacturer as the SMIS when the second manufacturer produces the part. In some implementations, the SMIS may be 8 characters long and may be in Base 58. Of course, it is understood that a longer or shorter SMIS may be used, so long as its length matches that of the FMIS.

The last element of the DSSN is a Product Identifier Sequence (PIS). The Product Identifier Sequence may be an identifier for the specific Pollux Pair, and may be generated by padding the (public) First Manufacturer Identifier Sequence to the (private) Surface-Texture Generation Sequence (STGS) and hashing the resultant string. In some implementations, the PIS may also be in Base 58. Because the DSSN is visible on a product, in some implementations, dashes or spaces may be used between the three elements for readability. For example, a DSSN may have the format below:

3KKA6Xoj-00000000-7EFkmHA9seqYH1onnGZR-vdSBqidep1F4PtPGCnhug0bs

In the example above, the PIS is a 44-character sequence, and this identifier is unique to each host object or each object, depending on the implementation. The central authentication server may generate the PIS for each object by appending the public manufacturer identifier (e.g., FMIS) to the STGS of that product and rehashing this string using SHA-256, as described above with regard to FIG. 4. The resulting digest is then converted to Base 58, which provides the final 44-character, signed product identifier. FIG. 4 illustrates the generation of a DSSN. Although the DSSN above is generated using the FMIS+SMIS+PIS, it is understood that these elements may be appended in any order, so long as the order is consistent across products and manufacturers.

Figure 5:
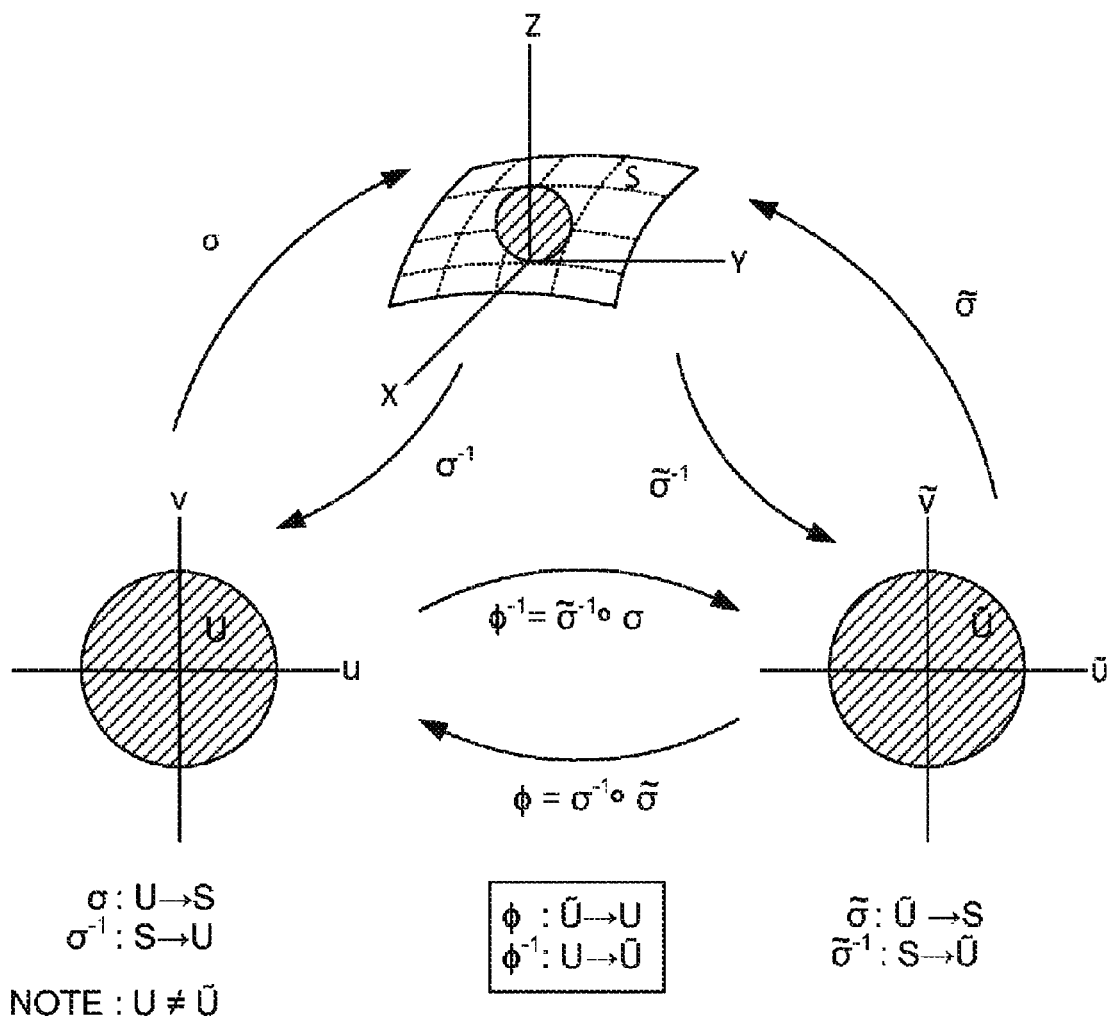
FIG. 5 illustrates a schematic proof of the origin pattern security scheme, in accordance with disclosed implementations.

FIG. 5 illustrates a schematic proof of the origin pattern security scheme, in accordance with disclosed implementations. The methodology supporting implementations is to deterministically construct a virtual three-dimensional surface from a secret set of input data, then print a snapshot of that surface, and present it with a signed encryption of the secret input data. The encryption processes used in the generation of both the pattern and the signature protect against internal collisions (where the system would generate identical pairs for two or more separate host products) and outside attack (where a counterfeiter would attempt to fool anyone who wishes to verify the authenticity of a certain product).

In the example of FIG. 5, U and $\tilde{U}$ represent 2D domains and S represents a 3D surface. $\sigma$, $\sigma^{-1}$, $\tilde{\sigma}$, $\tilde{\sigma}^{-1}$, $\Phi$, $\Phi^{-1}$ represent mapping functions. So long as the mapping functions $\sigma$ and $\tilde{\sigma}^{-1}$ are one-way, their inverses cannot be performed, and neither can $\Phi$ or its inverse. Therefore, a security scheme that applies these principles cannot be 'cracked' or reverse-engineered. If it is assumed that each entry to a set of input data (numbers or letters in a secret sequence) corresponds to a point in the two-dimensional U domain (analogous to a flat sheet of paper), we must find some process $\sigma$ that can construct a three-dimensional surface S from the data set lying in U. We must also find the inverse of some other process, $\tilde{\sigma}^{-1}$, that can map S into another two-dimensional domain $\tilde{U}$. Obviously, $\tilde{U}$ must be different than U in some way for this work to have been worth the effort. The purpose of taking the intermediate step in constructing S is that the transformation processes it introduces, $\sigma$ and $\tilde{\sigma}^{-1}$, are difficult to reverse and thus keep the set of input data U effectively hidden from any viewer observing $\tilde{U}$. This renders the possibility of determining the Transform Function $\Phi$, defined by $\Phi=\tilde{\sigma}^{-1}\circ\sigma$, effectively non-existent (as well as its inverse $\Phi^{-1}$).

The only viable candidates for $\sigma$ for the purposes of disclosed implementations, both in theory and in practice, are cryptographic hash functions. For example, the Secure Hash Algorithm (or SHA-2 family) is a function developed by the National Security Agency in 2001 to aid in the protection and authentication of digital files. These functions technically could be reversed to divulge the secret input data set—if they were truly "one-way" functions, the underlying mathematical principles described above could not be applied—but the computational power required to accomplish this is prohibitive. Fortunately, cryptographic hash functions also have long been the center of much attention in the information security industry, and several open-source implementations are considered to be highly robust for years to come.

Perhaps the most meaningful candidate for $\tilde{\sigma}^{-1}$, and certainly the most convenient to implement, is a 3D-to-2D projection function. The flat image U of a surface S from a particular viewpoint is a homeomorphism of that surface S, meaning that $\tilde{\sigma}^{-1}$ is a continuous and reversible transformation. However, with no exact knowledge of the surface S it is created from, finding the function $\tilde{\sigma}$ would be prohibitively difficult, and thus $\tilde{\sigma}^-$ can be considered irreversible and secure.

The transformation function $\sigma$ may be implemented using SHA-256, or another hash algorithm producing a 256-bit digest. The manufacturer's private 128-character input data, called a Private Manufacturer Identifier (PMI) may be thought of as a password that provides ownership access to all of that manufacturer's products. Thus, each manufacturer, whether an original manufacturer or one in the chain of ownership, has a unique PMI.

Figure 6:
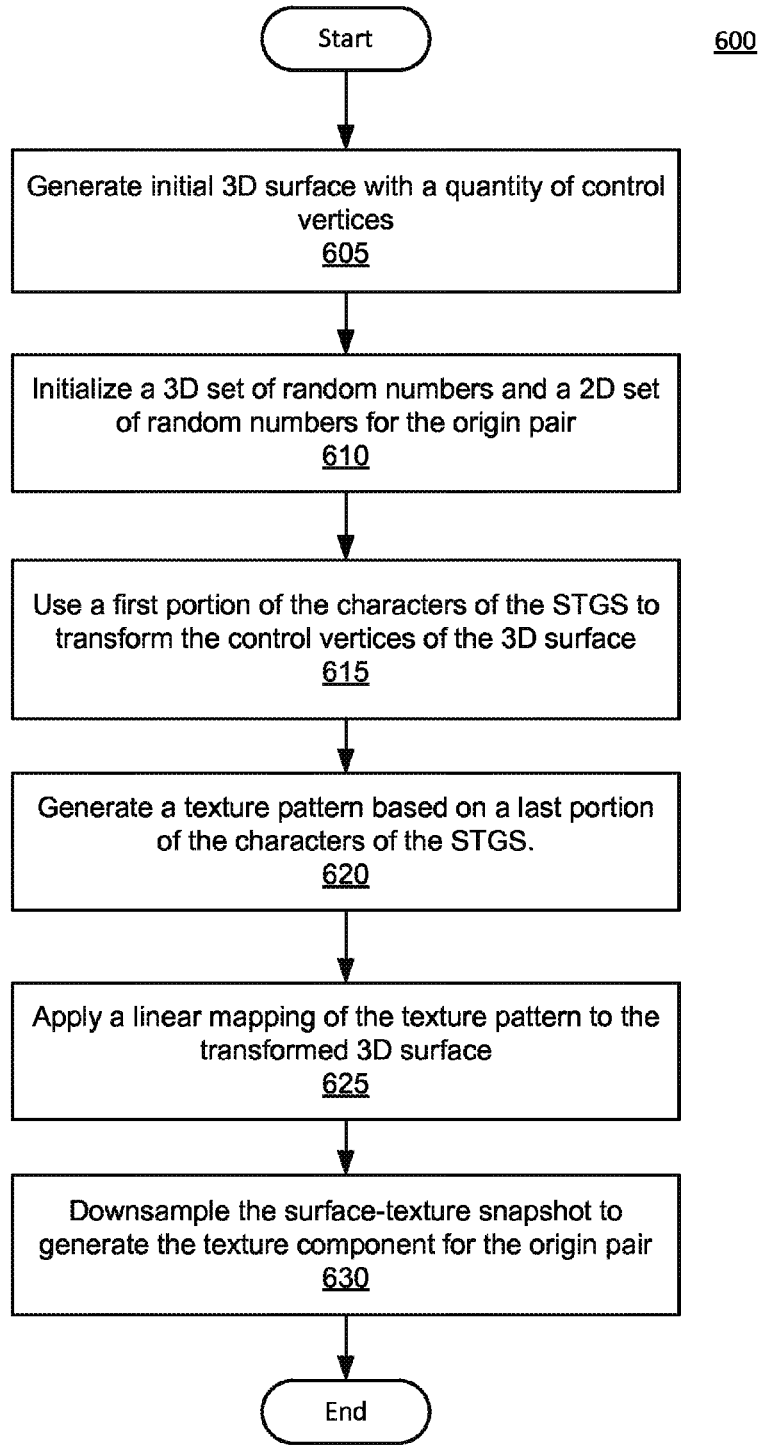
FIG. 6 is a flow diagram of an example process for generating a surface-texture component for an origin pattern, in accordance with disclosed implementations.

FIG. 6 is a flow diagram of an example process 600 for generating a surface-texture component for an origin pattern, in accordance with disclosed implementations. Process 600 may be performed by a central authentication server as part of step 330 of FIG. 3. In some implementations, process 600 may be performed by an origin pattern generation module. Process 600 may generate a surface-texture component of the origin pattern based on the STGS, generated as part of process 400. Because the STGS is unique to the origin pattern and its chain of ownership, the surface-texture component is also unique to the origin pattern and its chain of ownership. Process 600 may begin by generating an initial 3D surface with a quantity of control vertices (605). For example, the 3D surface S of FIG. 5 may be represented in a computer-assisted design (CAD) program. CAD programs have been in use for several decades. Non-Uniform Rational Basis Spline modeling (NURBS) is a particular subset of CAD that creates mathematically-driven surfaces which are controlled by sets of control vertices. By arranging the control vertices in space, a designer can create infinitely many shapes, and may 3D print physical models of those shapes if certain conditions are met. Implementations may work with many proprietary CAD software packages that are in use, but implementations also work with open-source programs and code libraries, such as OpenGL (Open Graphics Library).

Figure 7:
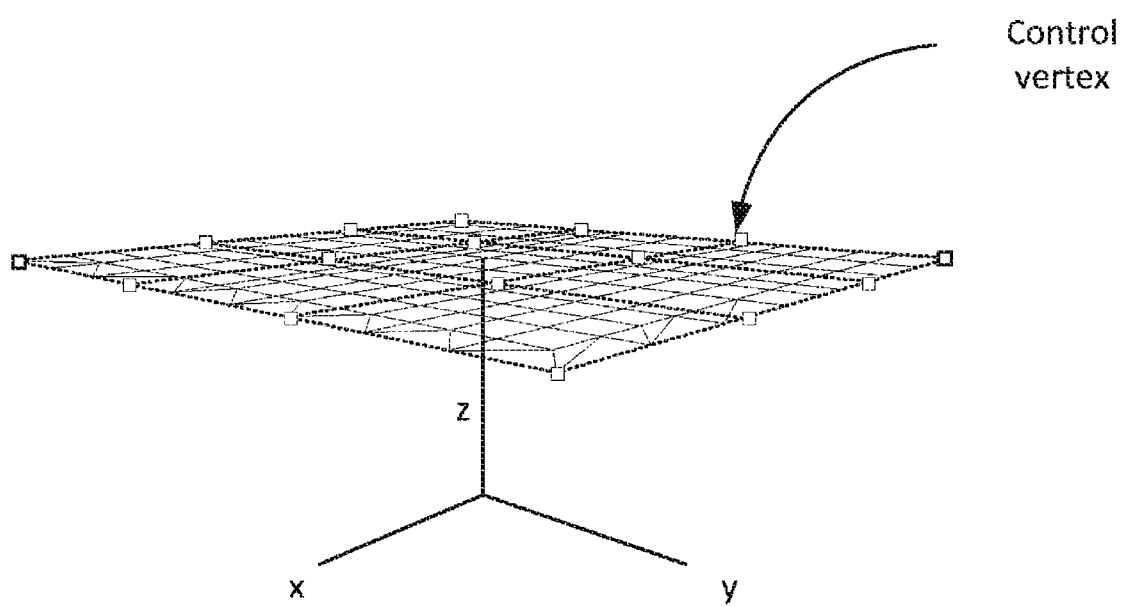
FIG. 7 is a 3D image of an example 3D surface in an initial state.

As indicated above, a NURBS surface is an equation-driven, thin sheet in 3D space, and is defined by a set of points called control vertices. A modeling program traverses these control vertices in their u and v directions, using polynomial functions to interpolate between them and always providing a smooth, manifold surface of arbitrary degree. Typically, surfaces of degree 3 in each their u and v directions are sufficient for most modeling situations, and is suitable for use in an origin pattern security scheme. Therefore, the surface generated here is composed from a 4×4 array of control vertices, as each control vertex describes a coefficient in a third-degree polynomial equation. FIG. 7 illustrates a 3D image of an example 3D NURBS surface in an initial state, e.g., where the control vertices are not transformed. The surface resembles a plane sitting just above the origin (shown by the x, y, and z axis unit vectors) in 3D space. The example surface of FIG. 7 includes 16 control vertices, illustrated as squares connected by hull lines, that have not yet been subjected to any kind of incrementation/decrementation transformation. In some implementations, the three-dimensional (3D) surface in its initial, pre-transformed state can have control vertices in the NURBS surface lying in a rectangular plane arrangement, producing a flat, featureless surface, as illustrated in FIG. 7. However, it is understood that the initial shape of the NURBS surface is arbitrary to the effectiveness of the hash-based transformations, so long as the initial state is consistent within the central authentication server. Moreover, although the example of FIG. 7 includes 16 control vertices, it is understood that implementations may include fewer or more control vertices.

The central authentication server may also initialize a 3D set of random numbers and a 2D set of random numbers for the origin pattern (610). The 3D set may be used in surface parameter mapping and the 2D set may be used for texture parameter mapping. The sets provide a set of randomly-initialized yet unchanging number outputs used to transform the control vertices in the 3D surface and a NURBS curve, as will be explained herein. The Surface Parameter Mapping Table 215 of FIG. 2 is an example of the 3D set and the Texture Parameter Mapping Table 220 is an example of the 2D set. The sets may include a random number for each possible hexadecimal character input (e.g., 0-F). The 3D set may include one array of random numbers for each of the x, y, and z coordinates and the 2D set may include one random number array for each of the x and y coordinates. The random numbers can serve as the transformation function for control vertices, as will be described herein.

Each control vertex in the 3D surface is composed by a 1×3 array that specifies the x, y, and z coordinates of the control vertex in 3D space. By incrementing or decrementing each of these values for each control vertex in a NURBS surface, the central authentication server can generate an infinite number of unique shapes. Incrementing or decrementing the x, y, and z coordinates of the control vertices is referred to as a transformation of the control vertices. Random transformation of the control vertices produces a unique surface, but the surface cannot be reliably reproduced. But a cryptographic transformation, based on values derived from a secure hash digest, for example a SHA-256 digest, can make the transformation appear random but be reliably reproduced using a given set of input data for the cryptographic hash function. Because the STGS is derived from a cryptographic function, the central authentication server may use a first portion of the characters of the STGS to transform the control vertices of the 3D surface (615). In some implementations, the first portion may be 48 characters of the STGS, because 1 character is used for each x, y, and z coordinate of each of the 16 control vertices (3×16=48). Of course, if more or less control vertices are used in the 3D surface the quantity of characters in the first portion of the STGS may change accordingly. To transform the first control vertex, e.g., the control vertex corresponding to the first three characters of the STGS, the central authentication server may use the first character of the STGS as an index into the x-coordinate array of the 3D set of random numbers. The value in the x-coordinate array located using this index represents the transformation value for the x-coordinate of the first control vertex. The central authentication server may then use the second character of the STGS as an index into the y-coordinate array of random numbers. The value located in the y-coordinate array using this index represents the transformation of the y-coordinate of the control vertex. The central authentication server may then use the third character in the STGS as an index into the z-coordinate array and use the value located as the transformation of the z-coordinate. In some implementations, the random numbers that represent the increment/decrement of each control vertex in the Surface Parameter Mapping Table 215 and the Texture Parameter Mapping Table 220 may be generated to be large compared to the control vertex's original proximities to each other so that the surface is sufficiently distorted—otherwise, all surfaces may have the same approximate shape and an inspector may have a difficult time differentiating between them.

Figure 8:
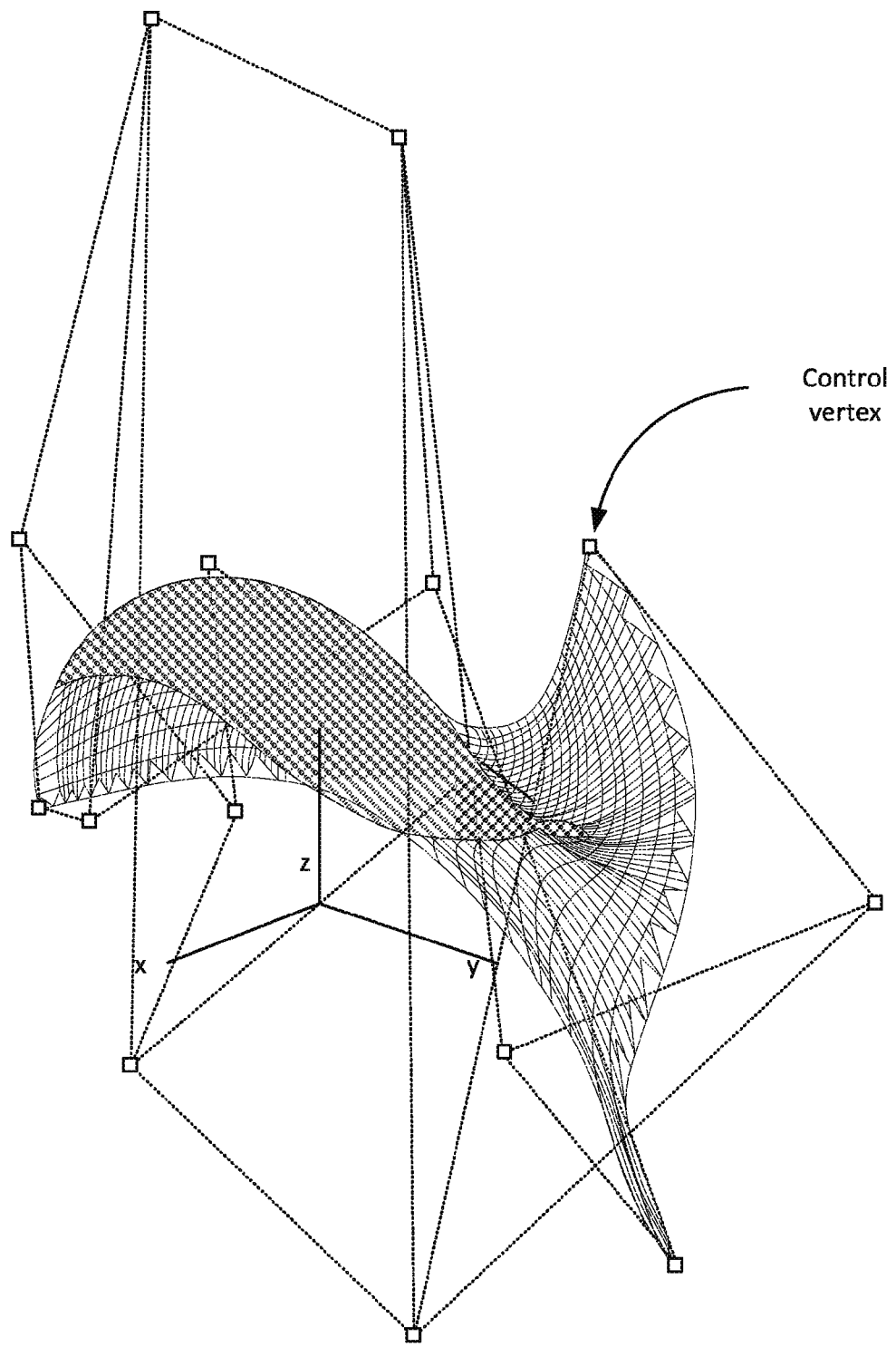
FIG. 8 is a 3D image of an example 3D surface after a cryptographic transformation of control vertices, in accordance with disclosed implementations.

FIG. 8 is a 3D image of an example 3D surface after a cryptographic transformation of its control vertices, in accordance with disclosed implementations. In the example of FIG. 8, the original surface from FIG. 7 has been transformed by incrementing or decrementing its control vertices' coordinates according to values derived from the STGS and a 3D set of random numbers for the origin pattern. While outwardly appearing random, the same surface can be reliably produced using a given set of input data for the cryptographic hash transformation of control vertices, namely the PMI, IRN, and SMIS used to generate the STGS and the 3D set of random numbers. This consistency enables the eventual verification of the origin pattern after its generation. The transformation function $\tilde{o}^{-1}$ may be implemented using several Open Graphics Library commands that can project a virtual 3D object onto a flat 2D plane (analogous to how one might view a computer model from his or her computer screen). But the unpredictability of the hash-derived surfaces may present two issues to address.

First, there must be some consistency to how the pseudo-random surfaces are displayed in their final form to make a verification process effective. It would be unsuitable to take a snapshot from the same position every time and hope that the surface more or less fits within the view of that snapshot. To provide consistency, the system may calculate the centroid (i.e., the point corresponding to the surface's center position) and the average surface normal vector (i.e., the best approximation of the direction in which one might look 'head on' at the surface), then translate and rotate the snapshot view according to those values, respectively. The snapshot's vertical to horizontal dimension ratio must remain uniform across all instances, although the actual size of the origin pattern may vary as needed, because allowing for different ratios would add unnecessary complexity to the verification phase.

Second, even with the overwhelmingly small odds of a 'collision' between two input data sets (producing the same resultant surface), there is still a reasonable chance of two surfaces appearing approximately the same from the final snapshot's viewpoint. Such a similarity could introduce problems for the verification phase, as the origin pattern verification module would be unable to differentiate between the correct surface and other invalid surfaces. To further distinguish 3D surfaces from each other, the central authentication server may generate a texture pattern that is mapped to the 3D surface, the texture pattern being based on a last portion of the characters of the STGS (620). The texture pattern may be based on NURBS curves. NURBS curves are tools for describing and creating an infinite range of smooth 2D curves. NURBS curves may be used to generate a distinct texture to assist in the differentiation of the 3D surfaces, as described above. In some implementations, the central authentication server may use the remaining 16 hexadecimal characters of the 64-character STGS to deterministically produce different curves with a wide range of appearances. The central authentication server may produce the curves by using a 2D set of random numbers to transform control vertices used to produce the curves. The Table 220 of FIG. 2, is an example of the 2D set of random numbers.

Figure 9:
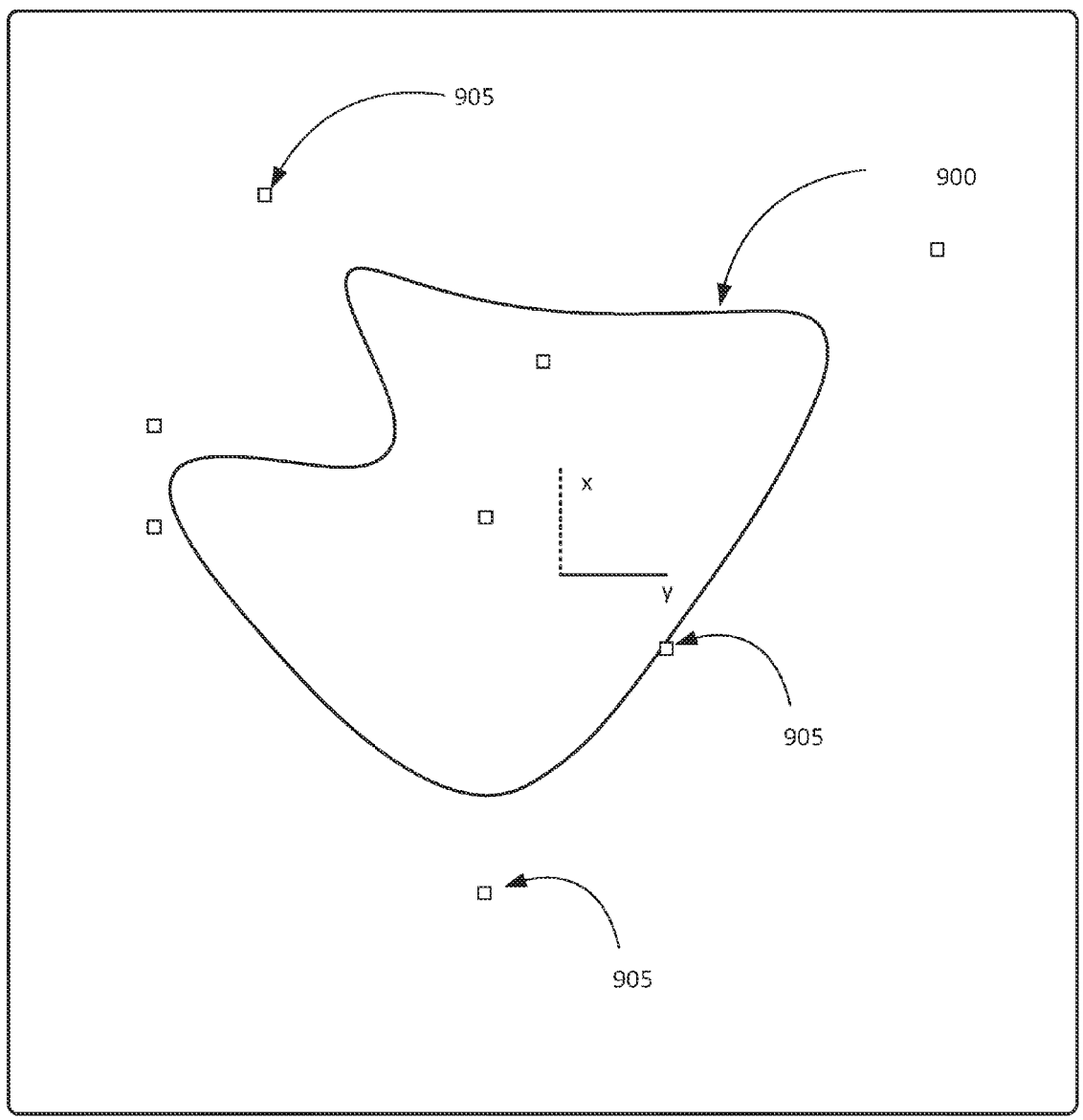
FIG. 9 is a 2D image of an example Non-Uniform Rational Basis Spline (NURBS) curve interpolated between a set of control vertices after a cryptographic transformation, in accordance with disclosed implementations.
Figure 10:
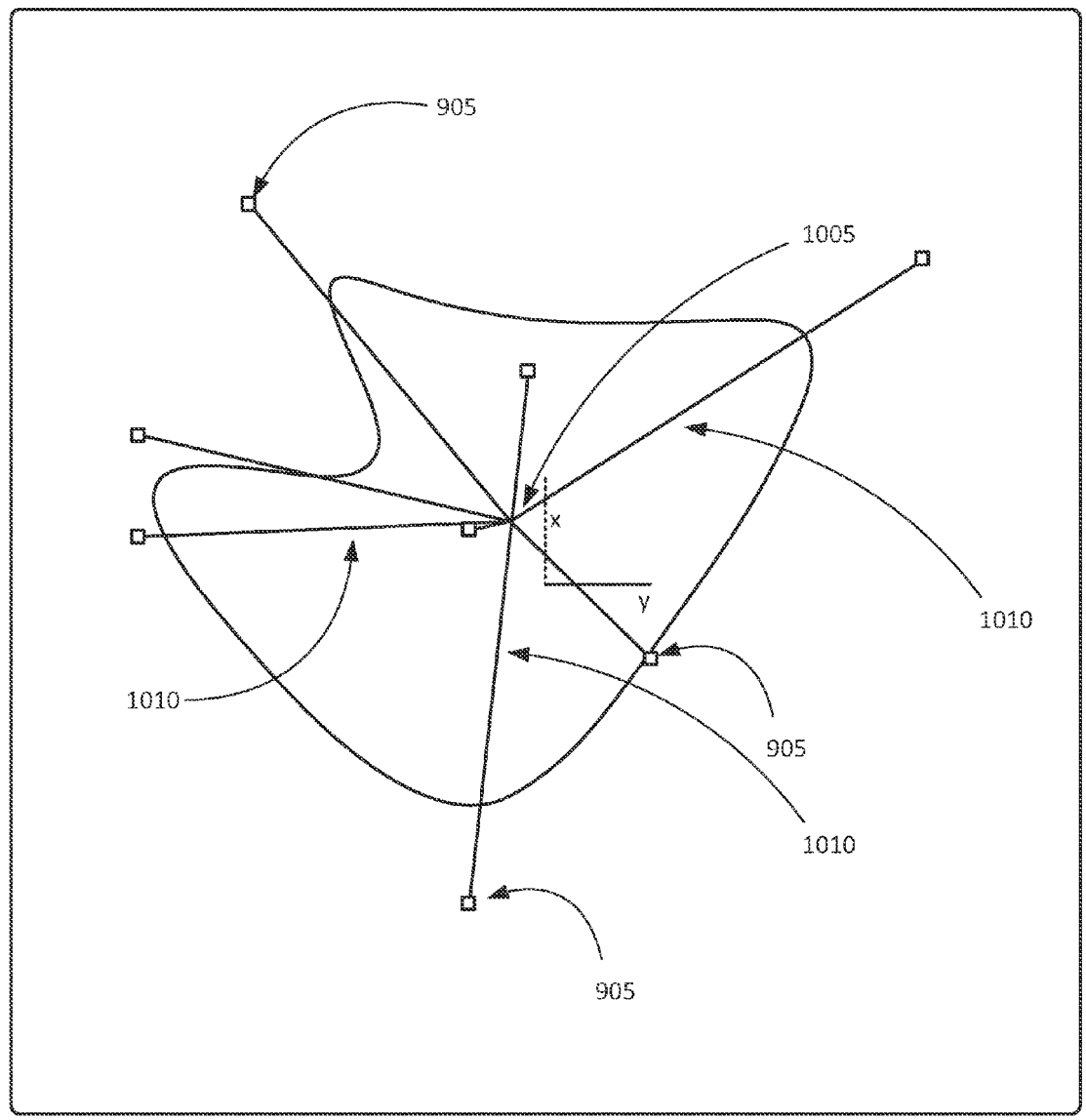
FIG. 10 is a 2D image that displays the centroid of the example NURBS's control vertices of FIG. 9 and a set of incrementation vectors between the centroid and the control vertices for deriving the remaining NURBS curves used to generate the texture portion of an origin pattern, in accordance with disclosed implementations.

For example, the central authentication server may plot out a set of eight control vertices in 2D space. The x and y coordinates of each control vertex may be transformed using the remaining 16 characters of the STGS. In other words, the first character of the 16 characters may be used as an index into the x-coordinate array of the 2D set of random numbers generated as part of step 610, and the value found in the array may be used to transform the x-coordinate of the first control vertex. The second character may be used as the index into the y-coordinate array in the 2D set of random numbers and the value used to transform the y-coordinate of the first control vertex. This process may be repeated for the remaining control vertices, so that the control vertices are cryptographically translated in 2D space, as illustrated in FIG. 9, the central authentication server may generate a smooth, closed NURBS curve 900 through the interpolation between these cryptographically translated control vertices 905. In order to prevent self-intersections within the curve, the central authentication server may rearrange the order of interpolation between control vertices 905 to a counter-clockwise traversal. While this first NURBS curve 900 serves as the basis for the texture's appearance, the central authentication server may generate many more splines to complete the texture. Therefore, the central authentication server may calculate the centroid 1005 of the control vertex set, as well as a set of rays 1010 that connect the centroid to the control vertices 905, as illustrated in FIG. 10. The central authentication server generates new sets of control vertices, each dictating the structure of a new NURBS curve at specified incrementations or decrementations along these rays, thus preserving a strong similarity between all the curves making up the texture.

Figure 11:
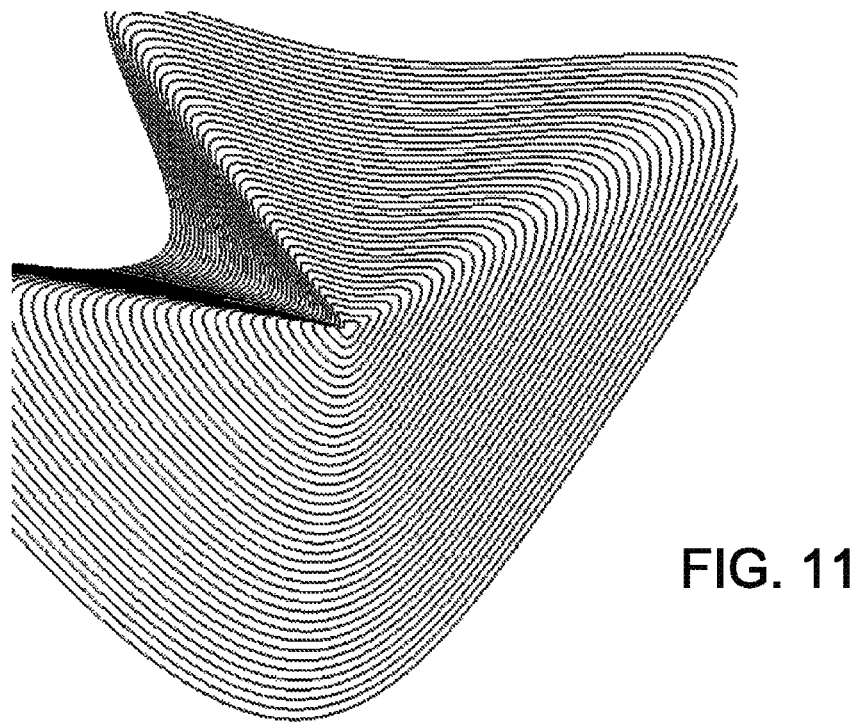
FIG. 11 is a 2D image that displays a set of NURBS curves comprising the 2D texture to be mapped to the 3D surface exhibited in FIG. 8.
Figure 12:
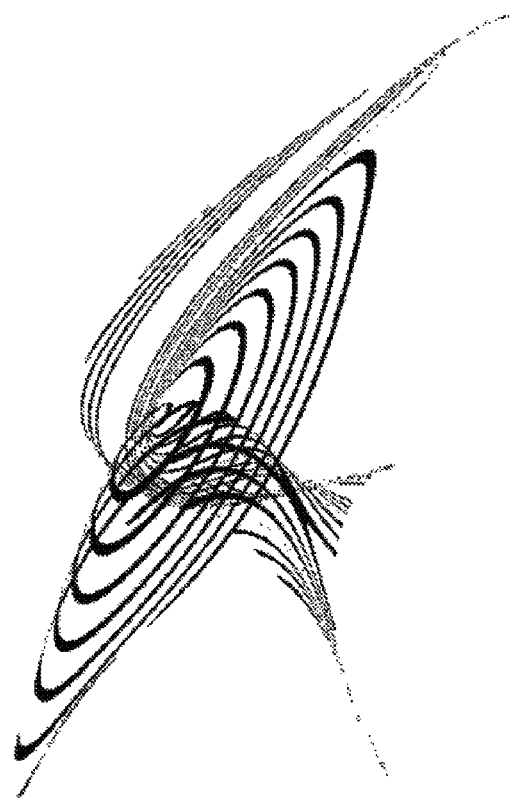
FIG. 12 is a 3D image of an example 3D surface after a cryptographic transformation of control vertices and linear mapping of an example 2D texture subjected to a separate cryptographic transformation, in accordance with disclosed implementations.

The final texture generated by the central authentication server is pictured in FIG. 11 as a bitmap image, and is highly unique and similar in appearance to a topographical map so that it is easy for a standard digital camera to distinguish between instances of this pattern. The central authentication server may apply a basic linear mapping of this texture to the cryptographically transformed 3D surface (625) to generate a surface-texture snapshot. For example, the central authentication server may apply a basic linear mapping of the texture illustrated in FIG. 11 to the 3D surface illustrated in FIG. 8. The result of applying the linear mapping of the texture in FIG. 11 to the 3D surface of FIG. 8 is a surface-texture snapshot, which is illustrated in FIG. 12.

To further aid in differentiating between hashed objects, the central authentication server may slightly downsample the surface-texture snapshot (630). This effectively limits error propagation during origin pattern imprinting, fabrication, and verification. Also, by further discretizing the relative dark and light spaces in an eventual smartphone verification image, this process allows the camera and verification application to more easily distinguish between imprinted and non-imprinted areas. A balance may be struck in the level of downsampling so as to avoid eroding the image quality of the origin pattern while also ensuring that the downsampling can be captured by a variety of manufacturing techniques. This resulting downsampled surface-texture snapshot is the surface-texture component of an origin. An example of the downsampled surface-texture snapshot of FIG. 12 is illustrated in FIG. 13 as surface-texture component 1315.

Figure 13:
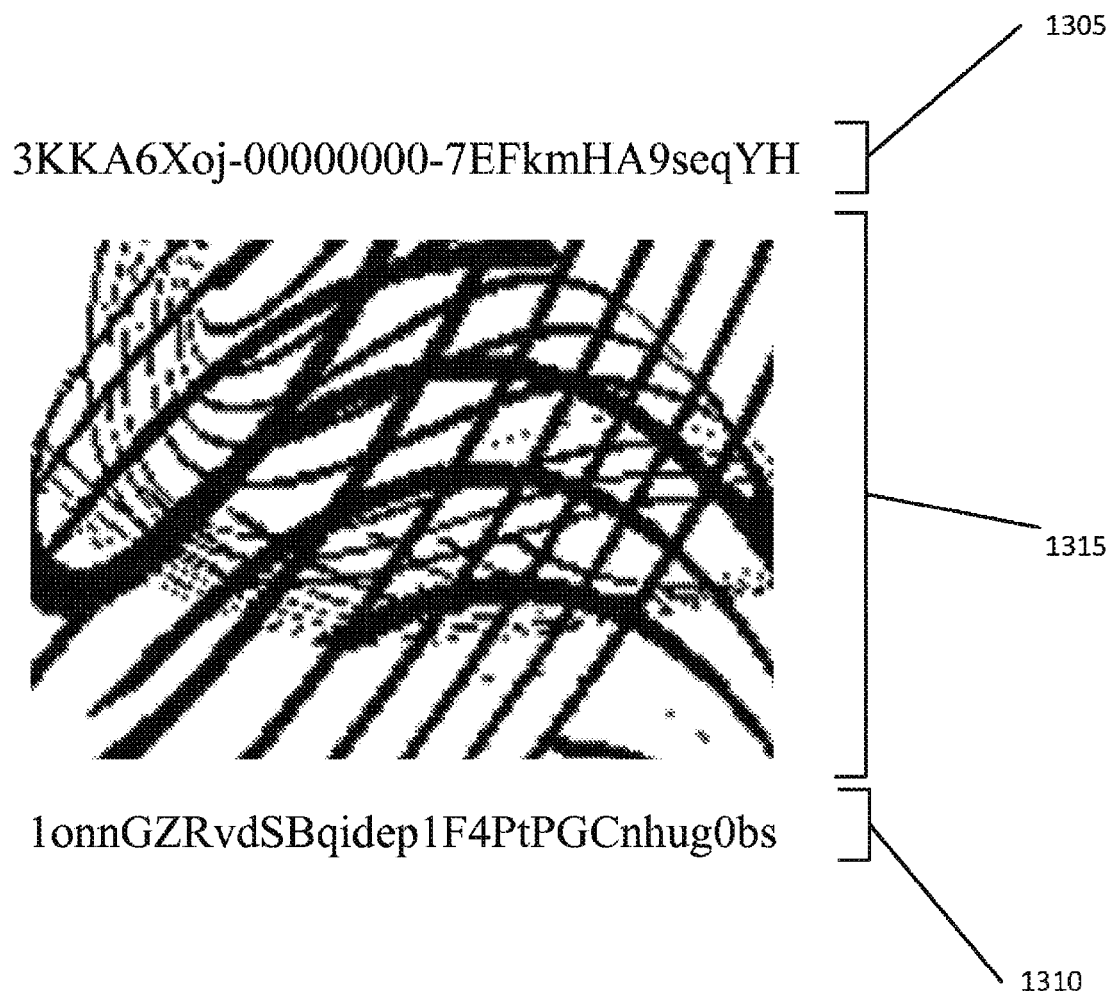
FIG. 13 illustrates an example 2D origin pattern, which may be affixed to a product, in accordance with disclosed implementations.

FIG. 13 illustrates an example 2D origin pattern, which may be affixed to an object, in accordance with an implementation. In the example of FIG. 13, the serial number's physical layout on the host object may be to horizontally list 31 characters of the serial number above the 2D surface-texture component and 31 below (total characters=8 characters+8 characters+44 characters+2 separation hyphens=62 characters=2 rows×31 characters per row). In the example of FIG. 13, the surface-texture component of the Pollux Pair is represented by item 1315. As indicated above, the 2D surface-texture component 1315 of FIG. 13 may be implemented as a 3D pattern, especially on products or parts produced using a 3D printer. Items 1305 and 1310 represent the serial number (or DSSN), split into two 31-character strings.

It would be unreasonable to expect every object using an origin pattern to provide a perfectly ideal surface to display the origin pattern on. Any significant distortion in the pattern caused by host object surface curvature, if left uncompensated for, could ruin the eventual verification process and render the verification process ineffective. To deal with this issue, a simple distortion detection pattern can be affixed to the host object in close proximity to the origin pattern. In the event that a product's particular size or geometry might require larger DSSN letters, the Pollux Pair could be presented in a different configuration, such as grouped together in a space in close proximity to the 2D surface-texture component with identical dimensions, as long as both Pollux Pair components are enclosed within the distortion detection pattern. Other physical layout formats may be chosen for certain implementations, such as displaying the DSSN in barcode, QR code, 2D matrix code, or other forms.

Figure 14:
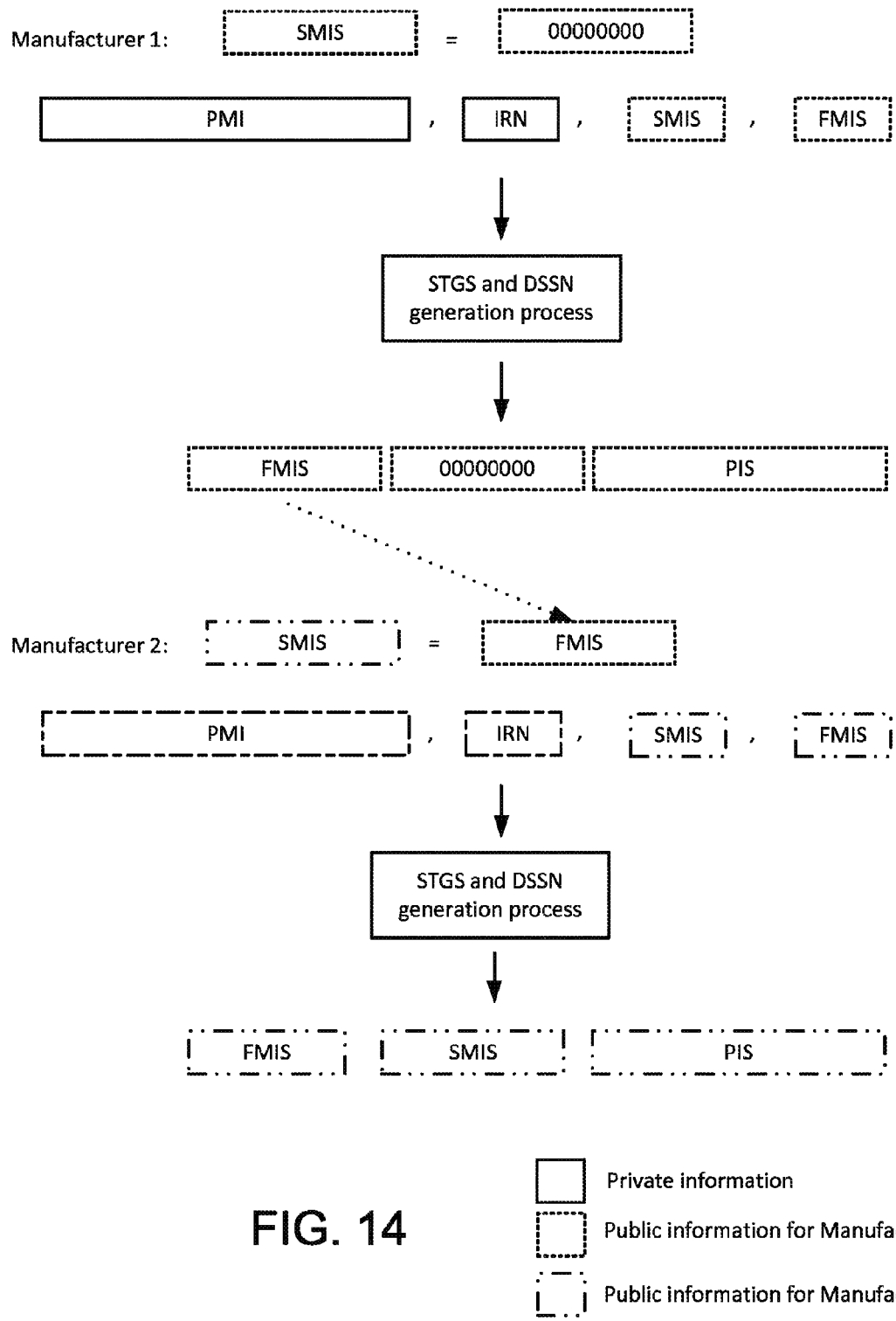
FIG. 14 is a block diagram of data elements used to generate an origin pattern that includes a chain of ownership, in accordance with disclosed implementations.

Note that the Second Manufacturer Identifier Sequence in the example above is a null sequence. The null sequence may be used when there is no previous link in the host object's chain of ownership, e.g., the manufacturer is an original manufacturer. Suppose, however, that the original manufacturer wishes to allow another authorized party to fabricate this object. To generate a separate origin pattern for the authorized party, the system may increment the IRN for the part, and append the FMIS of the original manufacturer to the incremented IRN and to the PMI of the authorized party. The system may hash this new combined string into a 64-character sequence, which represents an STGS for the part produced by the authorized party. Then, following the same procedure in generating the original manufacturer's origin pattern, the system may generate a DSSN by appending the second manufacturer's public identifier (or FMIS) to the STGS. This process can continue indefinitely, and is retraceable by the central authentication server that is in possession of all private information (e.g., the PMI and IRN). FIG. 14 illustrates an example of the deterministic linkage between origin patterns in a single chain of ownership.

The linkage between manufacturers in a chain of ownership as illustrated in FIG. 14 may continue indefinitely to produce a chain of ownership that is retraceable and verifiable by a central authentication server that possesses both the public and private information for each manufacturer's origin pattern(s). Thus, if two manufacturers enter into an agreement and wish to construct a chain of ownership, the central authentication server can verify the entire chain with a single origin pattern representing the last link in that chain. The verification process will be explained in more detail with regard to FIG. 16 below.

Figure 15:
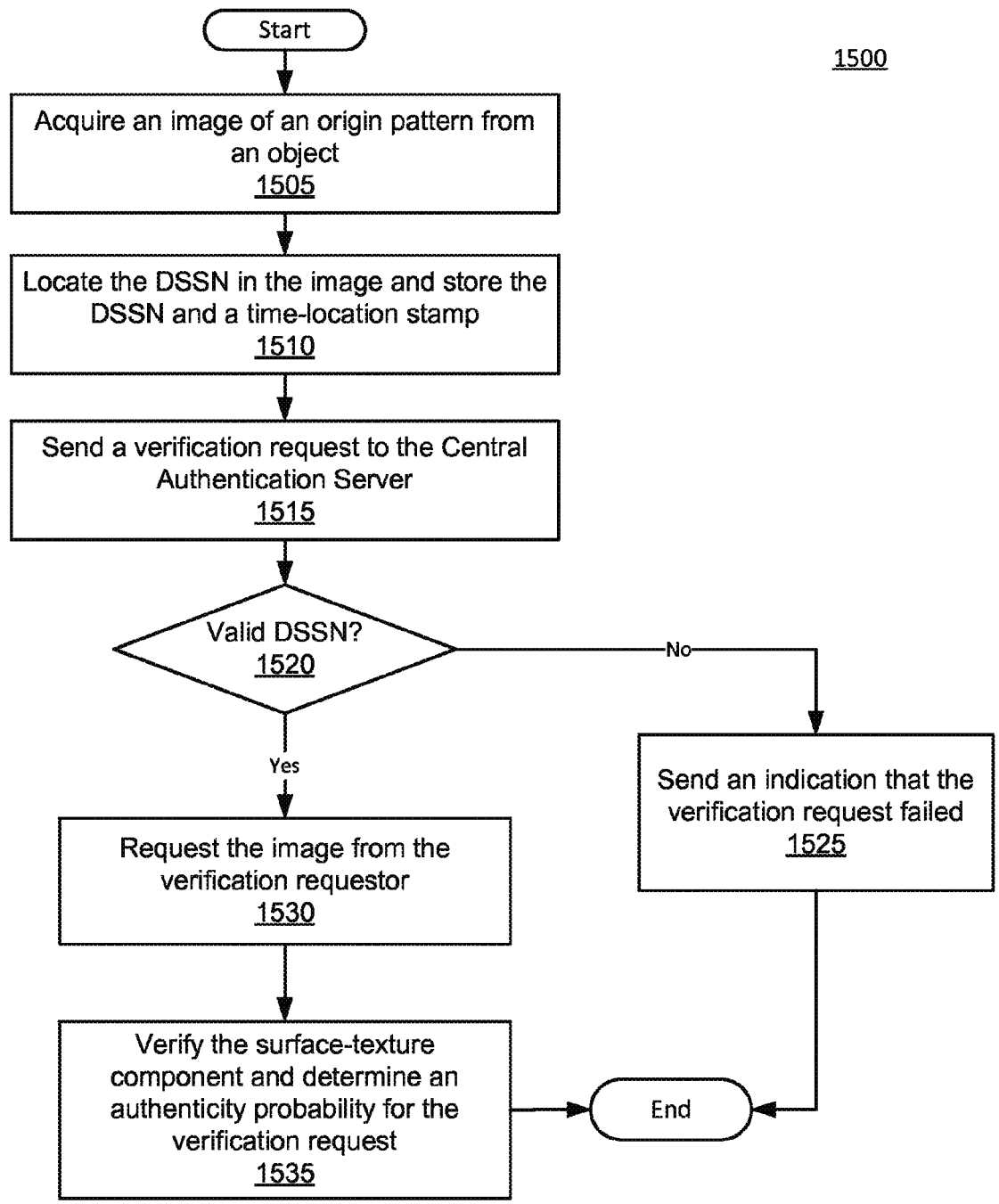
FIG. 15 is a flow diagram of an example process for verifying the origin of an object with an affixed origin pattern, in accordance with disclosed implementations.

FIG. 15 illustrates a flow diagram of a verification process 1500 for an origin pattern, in accordance with some implementations. The process 1500 may be performed by an authentication system, such as system 100 of FIG. 1. An individual, e.g., an inspector, may open a product verification application, such as application 182 of FIG. 1, and acquire an image of the origin pattern on an object (1505). The product verification application may also be referred to as a mobile client. Examples of the mobile client include smartphone apps. The mobile client is a verification requestor that is in communication with the central authentication server. The product verification application may analyze the image to locate the serial number (e.g., DSSN) component of the origin pattern, undistort the origin pattern (including both the surface-texture component and the DSSN as both parts will be scanned optically), and store the DSSN (1510). In some implementations, the product verification application may also store a time-location stamp for the image. The product verification application may send the DSSN and time-location stamp to a central authentication server (1515). The DSSN and the time-location stamp are one example of a verification request. In some implementations, the product verification application may forward the acquired image to the central authentication server, and the central authentication server may analyze the image as described above, locating the DSSN. Accordingly, step 1515 may include sending the acquired image to the central authentication server and the central authentication server may perform step 1510 on the acquired image. Thus, an acquired image is another example of a verification request.

The verification request can also include a requestor identifier that corresponds to the mobile client that sent the verification request.

The central authentication server may determine whether the DSSN exists in a data store (1520), for example origin pattern data 12 of FIG. 1. In other words, the DSSN imprinted on the host object must exist in a data store on the central authentication server. In some implementations, this may be determined by a single database query. In some implementations, this may include parsing the various elements of the DSSN, for example into the FMIS, SMIS, and PIS components. If a DSSN is located (1520, Yes), it confirms at least that the final link in the product's chain of ownership exists. This is a first test that an object must pass to be authenticated. If the DSSN is not found (1520, No), the central authentication server may send a message back to the product verification application indicating that the verification request for the object failed (1525), e.g., the object did not pass the authentication test. Process 1500 then ends for this verification request.

If a DSSN is found (1520, Yes) (e.g., the serial number component of the origin pattern is present), the central authentication server can be reasonably sure that the verification request is not spam to slow down the system's processing capabilities, and the central authentication server may request the image of the origin pattern from the verification requestor (e.g., the mobile client) (1530). Because data transfer of an image is more time consuming and costly than transfer of short character sequences, in some implementations, this request can be delayed until the first verification test has been passed, as illustrated in FIG. 15. The mobile client may then return the image of the Pollux Pair to the central authentication server, if it was not transmitted prior to passing the first test. Of course, in some implementations the surface-texture component may be provided with the DSSN, or the acquired image may be provided to the central authentication server as part of the verification request and the central authentication server may obtain the surface-texture component from the image. When the central authentication server receives the surface-texture component, the central authentication server may verify the surface-texture component and determine an authenticity probability for the verification request (1535). Verifying the surface-texture component includes verifying the chain of ownership, as described in more detail below with regard to FIG. 16. Even if the origin pattern is verified, the authenticity probability can be used to identify unauthorized copies that have a duplicate of a valid origin pattern, as described in more detail with regard to FIG. 17. Verification failure or authenticity probability information may be returned to the verification requestor (e.g., the mobile application) as part of verifying the original pattern and determining the authenticity probability. Process 1500 then ends for this particular verification request.

Figure 16:
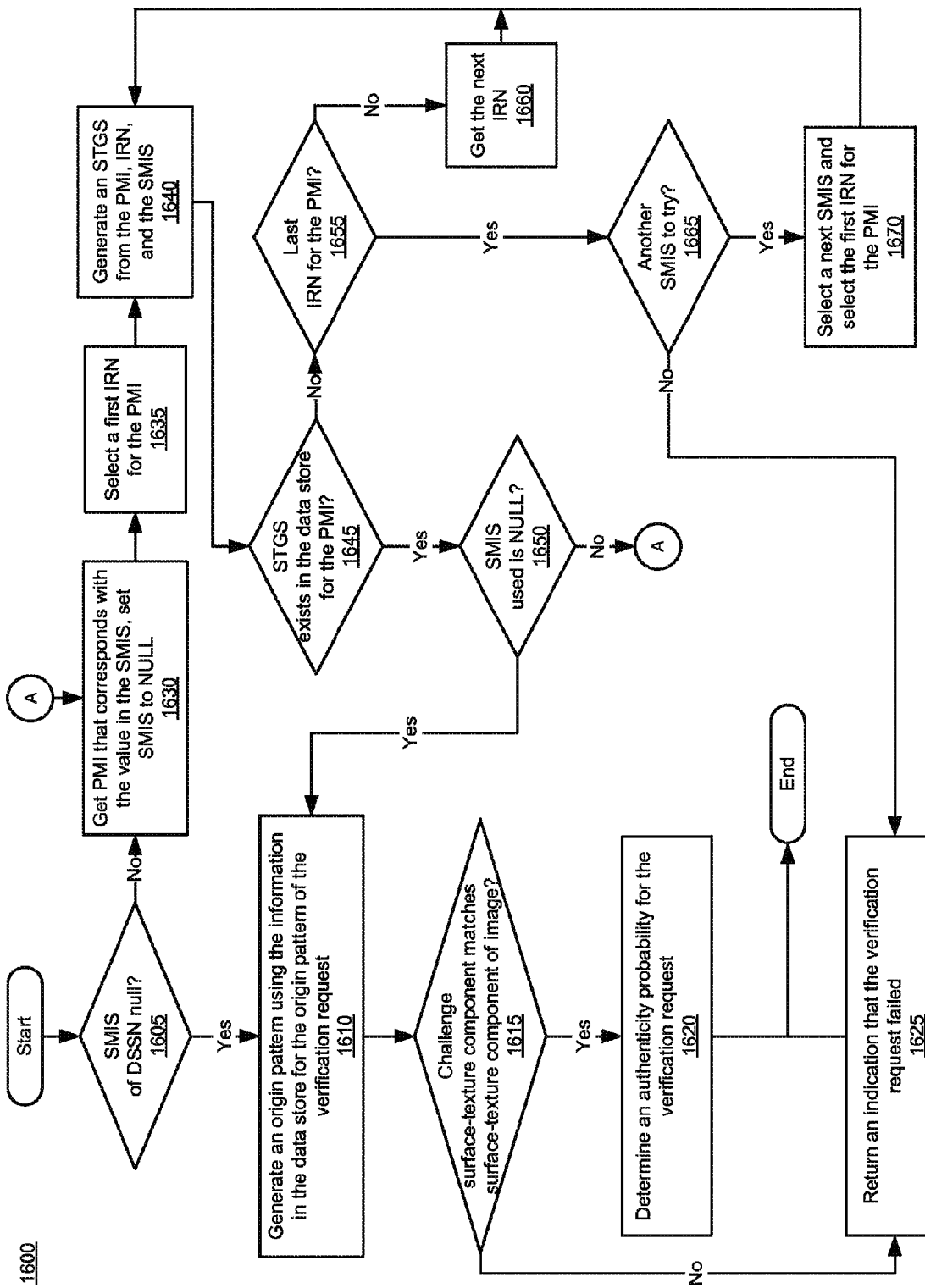
FIG. 16 is a flow diagram of an example surface-texture component verification process, in accordance with disclosed implementations.

FIG. 16 illustrates a flow diagram of an example surface-texture component verification process 1600, in accordance with disclosed implementations. Process 1600 may be performed in response to a verification request passing the first test, e.g., step 1520 of FIG. 15. In other words, process 1600 may be performed as part of step 1535 of FIG. 15 and process 1600 assumes the serial number component (i.e., the DSSN) has been verified and is present in the data store. In some implementations, process 1600 may be performed by an origin pattern verification module, such as origin pattern verification module 134 of FIG. 1, of the central authentication server.

To begin process 1600, the central authentication server may determine whether or not the chain of ownership identifier, e.g., the second element of the DSSN or SMIS, is null ("0000000") (1605). If the SMIS element is null there is no previous link in this product's chain of ownership and the DSSN is for an original manufacturer. If the SMIS element is non-null, the object was manufactured in a chain of ownership, and the central authentication server may run through the entire chain of ownership and verify that a valid serial number component exists for each link. As the central authentication server follows the chain backwards and reaches an SMIS that is null, the central authentication server can be thought to have arrived at the first link in the chain, and the chain has been verified.

If the SMIS is null (1605, Yes) or if the chain of ownership has been verified (1650, Yes), the central authentication server may generate an surface-texture component using the information in the data store for the origin pattern identified in the verification request (1610). In other words, using the information from the DSSN obtained from the image on the object and corresponding information from the data store, the central authentication server may generate a challenge surface-texture component. For example, each FMIS has a corresponding PMI, and the data store has the object identifier (i.e., IRN) that correspond with the DSSN. Using the FMIS, SMIS, PMI, and IRN, the central authentication server can generate the challenge surface-texture component as described with regard to FIG. 6. Once the challenge surface-texture component has been generated, trimmed, and spliced with a distortion detection pattern, the central authentication server may compare the challenge surface-texture component to the surface-texture component of the origin pattern from the image (1615) that was submitted for verification. This test can only be passed if there is a high confidence in a match between the pictures. In some implementations, the confidence may be 98% or more. In some implementations, the confidence percentage may be adjusted by the original manufacturer via the generation client (e.g., client 160 of FIG. 1). This cryptographic/differential geometry approach provides the bulk of the robustness of the authentication process. If there is a match (1615, Yes), the central authentication server may determine an authenticity probability for the verification request (1620). Determining an authenticity probability may be performed as described with regard to FIGS. 17 and 18. Process 1600 may end, with a response to the verification request being provided as part of determining the authenticity probability. In some implementations, the central authentication server may skip step 1620 and may return an indication that the verification request is successful. However, determining the authenticity probability provides an extra layer of security for identifying counterfeit objects.

If the challenge surface-texture component does not match (1615, No), the central authentication server may return an indication that the verification request failed (1625). In some implementations, the indication may be an error message or other information that conveys an unsuccessful test to the verification requestor. Process 1600 then ends.

If the SMIS is not null (1605, No), the origin pattern includes a chain of ownership and the central authentication server may traverse the chain backwards, verifying each link. If the central authentication server is unable to verify a link, the verification test fails. As indicated above with regard to FIG. 14, the STGS for any origin pattern instance is generated by hashing the PMI of the manufacturer appended with the IRN (also for the manufacturer) and the SMIS, which represents either a null sequence, if it is the first link, or the FMIS of the previous owner. To move backwards in the chain, the central authentication server may get the PMI that corresponds to the SMIS (e.g., the non-null value from step 1605) of the origin pattern (1630). The central authentication server may also set the SMIS to null, which allows the central authentication server to assume that this current link in the chain of ownership is the first link. If it is not the first link, the central authentication server may cycle through valid FMIS values, as will be explained herein. The central authentication server may then select a first IRN for the PMI (1635). As previously discussed, each manufacturer (and thus, each PMI) has a range of valid IRNs. The central authentication server may cycle through the IRNs. In other words, the central authentication server may search the data store for entries with the desired FMIS+SMIS+PIS combination by incrementing through all IRNs belonging to the current manufacturer. At each step, the PMI+IRN+SMIS string is rehashed, and if the resultant hash digest matches any of the STGSs belonging to a Pollux Pair object, the link is verified. If that link also has a non-null SMIS, the central authentication server may continue to move backwards.

Accordingly, the central authentication server may generate an STGS by applying the hash function to the appended PMI+IRN+SMIS string, as described with regard to FIG. 4 (1640). The central authentication server may determine whether this generated STGS exists in the data store in an entry associated with the PMI, or the current manufacturer (1645). For example, if the STGS exists in data 205 with an FMIS that corresponds to the PMI (because the FMIS is the public identifier for the manufacturer where the PMI is the private identifier), the central authentication server has verified the current link.

If the link is not verified (1645, No), the central authentication server may continue to cycle through the valid IRNs for the PMI. Thus, the central authentication server may determine if the IRN just used was the last valid IRN for the PMI (1655). If it is not, the central authentication server gets the next IRN (1660), and generates a new STGS using the new IRN (1640). If the IRN is the last valid IRN for the PMI (1655, Yes), the central authentication server may cycle through valid values for the SMIS. Thus, the central authentication server may determine whether there are other SMIS values to try (1665). If there are (1665, Yes), the central authentication server may select a next SMIS, select the first IRN for the PMI (1670), and try again to generate a valid STGS for the PMI+IRN+SMIS combination (1640). If there are no other SMIS values to try (1665, No), the chain of ownership is not valid, and the verification request fails. Accordingly, the central authentication server may return an indication that the verification request failed (1625), and process 1600 ends for the verification request.

If the link is verified (1645, Yes), the central authentication server may determine whether the SMIS used to generate the STGS is NULL (1650). If it is NULL (1650, Yes), the first link has been reached and the entire chain of ownership has been verified. Accordingly, the central authentication server may verify the surface-texture component, as described above with regard to steps 1610 through 1625. If the SMIS is not NULL (1650, No), the SMIS represents the FMIS of another manufacturer, and the central authentication server may continue to move backwards in the chain to verify the previous link. Accordingly, the central authentication server may repeat the process of getting the PMI for the other manufacturer (e.g., the PMI that corresponds with the SMIS, and cycle through the IRN+SMIS combinations to determine if a valid STGS exists, e.g., starting again at 1630 with the new PMI, until the original link in the chain of ownership is located or the chain of ownership fails the validation test.

Figure 17:
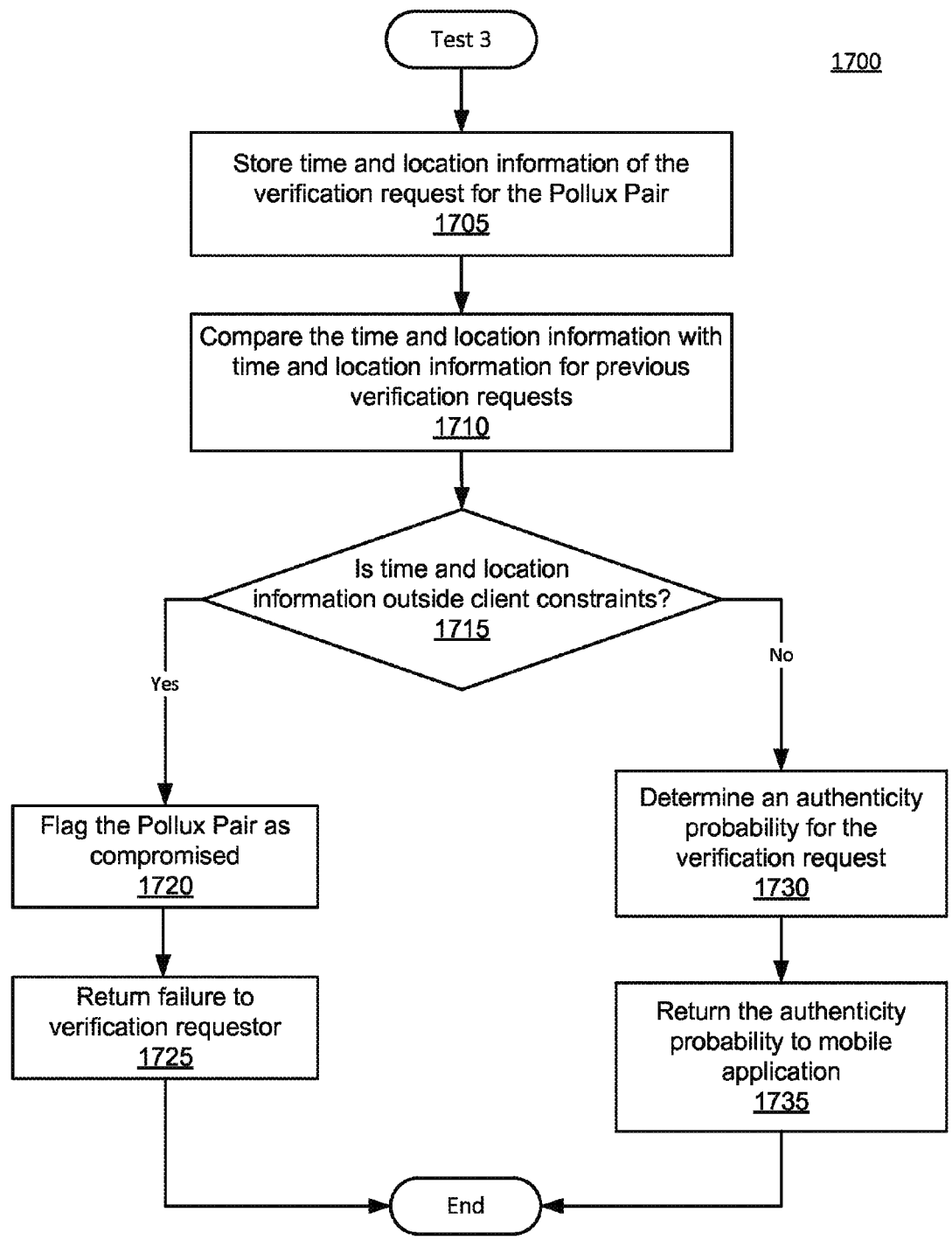
FIG. 17 is a flow diagram of an example process for using time and location during verification of an object with an affixed origin pattern, in accordance with disclosed implementations.

FIG. 17 is a flow diagram of an example process 1700 for using time and location during verification of the origin of a product, in accordance with disclosed implementations. The time and location verification may be a third test applied to a verification request by the central authentication server. In some implementations, process 1700 may be performed by an origin pattern verification module, such as origin pattern verification module 134 of FIG. 1, of the central authentication server. The process 1700 may be performed when the central authentication server decides the Pollux Pair just generated matches the Pollux Pair image on the object, e.g., as part of step 1620 of FIG. 16. In the process 1700, the central authentication server stores time and location information for the verification request (1705). In some implementations, the central authentication server may store the time and location information in a table entry, such as Time-Location Stamp Table 210 of FIG. 2, for the matched Pollux Pair. The central authentication server may compare the time-location information to time-location information for previous verification requests (1710). The previous verification requests may be existing entries in the TLST for the Pollux Pair. The comparison of time-location information for a Pollux Pair may enable the central authentication server to evaluate the likelihood of an attacker copying an existing Pollux Pair and attaching it to a counterfeited object.

The central authentication server may optionally allow a registered generation client to impose constraints, either strict or probability-driven, on the time-location entries of Pollux Pairs generated for the registered client. For example, the generation client may allow the manufacturer to set windows on valid time information. Such windows may be dictated by the manufacturer's logistical processes (e.g., different stages of product fabrication and assembly, timeframes in which sourced parts might arrive at a factory, etc.) and verification requests made outside the window are considered compromised. As another example, an air freight shipping container may appear in many locations around the world in a short time period while a spare auto part may be licensed only for use in the United States. Accordingly, the spare auto part manufacturer may have a constraint that limits valid location information to the United States, while the air freight shipper may have a constraint that limits valid location information to the shipping route. Accordingly, the central authentication server may determine whether the time-location information conforms with the manufacturer's constraints for the Pollux Pair (1715). Such constraints may be provided per Pollux Pair instance when it is generated, although in large batch generation runs, extra functionality can be added to allow for a manufacturer to impose identical constraints on many Pollux Pairs simultaneously upon their creation.

If the time-location information fails to conform with the constraints (1715, Yes), the central authentication server may flag the Pollux Pair as compromised (1720). For example, if the location entries in the time-location data for a Pollux Pair start including attempted verifications from Asia Pacific when the constraint indicates US locations are valid or when the central authentication server starts receiving attempted verifications from South America and Eastern Europe within a short time-period (e.g., a matter of hours when the constraints specify a matter of days) for a Pollux Pair, the central authentication server may flag this Pollux Pair as potentially compromised. In some implementations, this may occur by marking those verification requests as unconfirmed using the verification tag and/or by calculating and displaying the unconfirmed authenticity probability. In some implementations flagging the Pollux Pair as compromised may be indicated by decreasing a confidence that the match is authentic to level that would indicate inauthenticity, e.g., penalizing the authenticity probability. The central authentication server also returns a failure response to the verification requestor (1725), which is an indication to the requestor that the item is not, or may not be, authentic. Process 1700 then ends for this particular verification request.

If the time-location information does conform to the constraints (1715, No), the central authentication server may determine an authenticity probability for the verification request (1730). The authenticity probability may be assigned based on a probabilistic authentication process. The authenticity probability may be an indication of the likelihood that the verification request is for an authentic article. In other words, the central authentication server may attempt to determine which of the host objects optically scanned for the various verification requests represent original objects as opposed to counterfeit objects by weighing the validities of all the requests against each other. Under these circumstances, a winning host object may be determined by its relative location proximity to the last confirmed verification request in comparison to objects represented by the other losing requests. Due to the flexibility of the range of constraints a manufacturer may choose to apply, this relative 'secure' location proximity may be determined by a request's velocity and may even shrink with time if a pattern in time-location data arises. If a clear winner emerges, e.g., as indicated by a pattern in time-location data, the central authentication server may assign an authenticity probability that is high compared to the authenticity probability of "false" verification requests. The central authentication server may reference the winner as the preferred Pollux Pair from then on, and verification requests that differ from the time-location data pattern may be marked as likely fraudulent (e.g., assigning a very low authenticity probability). Thus, implementations provide degrees of probability that are increasingly difficult to cheat as more verification attempts are added to a Pollux Pair's time-location information (e.g., represented in the TLST). The more entries existing in a Pollux Pair's time-location information that fit into a recognizable pattern, the quicker and more effectively the central authentication server will be able to sort out potential conflicts as part of process 1700. The central authentication server may return the authenticity probability to the verification requestor, e.g., via the mobile application (1735). The probability provides an indication to the verification requestor about whether the object scanned is authentic or not. In some implementations, if the probability fails to meet a threshold the central authentication server may optionally provide a message indicating the object has a high probability of being counterfeit. In some implementations, the central authentication server provides the probability and allows the requestor to make conclusions about the authenticity of the object. In some implementations, the central authentication server may provide additional information to the verification requestor, such as the number of previous verification requests, a message, etc. Process 1700 then ends for this particular verification request.

FIG. 18 is a flow diagram of an example process 1800 for determining the likelihood of authenticity of a product with an affixed origin pattern, in accordance with disclosed implementations. Process 1800 is one example of a probabilistic authentication process that may be performed as part of step 1730 of FIG. 17. A central authentication server may perform process 1800 to examine the time and location of a verification request within the context of any constraints or patterns that may already exist for a particular Pollux Pair. In some implementations, the process 1800 may use time-location information from a particular verification request for a Pollux Pair as well as constraints, such as a minimum wait time and a velocity threshold. The time-location information may be an entry in a TLST table for verification request n (e.g., timeArray[n], locArray[ ][n][ ], and locArray[ ][ ][n] of FIG. 2). The minimum wait time prevents spamming of the central authentication server and the time-location information (e.g., the TLST).

Process 1800 may begin with the central authentication server comparing the time that has passed since the last verification request to a minimum wait time (1805). The minimum wait time may be a minimum time that must pass between verification requests, which may be specific to the manufacturer, the object (product), or a system-wide variable. In some implementations, the minimum wait time may be passed to process 1800 as a parameter. If the minimum time has not been reached (1805, No), the central authentication server may provide a response to the verification request that prompts the requestor to try again later (1810). Process 1800 then ends for this verification request without providing an indication of whether the object is authentic.

If the minimum wait time has been reached (1805, Yes), the central authentication server may determine whether the verification requestor is the verification owner of the Pollux Pair (1815). As discussed above, the verification owner of the Pollux Pair is the consumer-side owner of that Pollux Pair-embedded product. In some implementations, the owner may be identified as part of the Pollux Pair information in data 205. The verification owner may be identified by comparing the verification owner identifier in the data store with a requestor identifier provided as part of the verification request. If the verification requestor is the verification owner (1815, Yes), the central authentication server may reset the authenticity probability to 1.00 (1850) and return the authenticity probability to the requestor, e.g., via the mobile application. Thus, the central authentication server does not perform probabilistic authentication when a verification owner makes a verification request. Instead, the central authentication server bypasses the final verification test and adds a new entry to the Pollux Pair object's TLST with an authenticity probability that represents an authentic object.

Bypassing probabilistic authentication may be especially useful in some high-velocity cases, such as where a Pollux Pair-embedded object is a highly portable, consumer-side product. Without bypassing probabilistic authentication the central authentication server may unfairly penalize a product owner (e.g., the legal purchaser of the product) for the ease with which the product moves through commerce, making it harder for the owner to sell the product. To avoid such unfair penalties, each user of the mobile verification application may choose to be identified by a random 64-character sequence, which may be then stored as the verification owner value for the product, for example using the data 205. The verification owner becomes the last link in the chain of ownership, although this consumer-side link carries only verification privileges and not intellectual property ownership. If an incoming verification request includes a requestor identifier that matches the Pollux Pair's current verification owner identifier, the central authentication server bypasses the probabilistic authentication and the Pollux Pair's object data are updated (e.g., confirmed time-location entry, authenticity probability, verification requestor identification if necessary, and verification tag if non-null), and the authenticity probability is reset to 1.00. The assignment of an inspector's identifier as the Pollux Pair's verification owner identifier can be made only with the consent of either the previous verification owner or the manufacturer (e.g., the manufacturer identified by the FMIS of the Pollux Pair). This may occur during a transaction involving the sale or purchase of that Pollux Pair's host product. To simplify the user experience, this process may be hidden as much as possible from the transaction and verification processes.

If the verification owner is not the requestor (1815, No), the central authentication server may determine whether the maximum velocity has been reached for the Pollux Pair (1825). The velocity threshold represents the greatest distance per unit of time that a Pollux Pair-affixed object or product can travel between consecutive verification requests. The velocity threshold may thus be Pollux Pair specific, manufacturer specific, or object specific. In some implementations, the velocity threshold may be provided to process 1800 as a parameter. The central authentication server may calculate the distance per unit of time for the current verification request based on the time-location information in the current request and the time-location information in a verification request that occurred just prior to the current request. If no prior verification requests exist, then the velocity threshold is not met.

If the velocity threshold has been reached (1825, Yes), the central authentication server may set the authenticity probability (e.g., authProb[n] of the TLST 210 entry n for the Pollux Pair) for this request to a value that represents a severe penalty on the authenticity (1830). For example, the central authentication server may take the authenticity probability of a previous confirmed verification request or (e.g., n−1) and divide the previous authenticity probability by a severe penalty factor, such as 100 or 1000 (of course, the severe penalty factor could be 0.01 or 0.001 and the central authentication server could multiply the previous authenticity probability by the penalty factor). In other words, the central authentication server may set the authenticity probability of the current verification request to a value significantly lower than the authenticity probability of the previous confirmed request. Accordingly, as more requests reach the velocity threshold, the less likely it is that the central authentication server provides an authenticity probability that represents an authentic product. Using the prior confirmed request, the central authentication server may prevent verification damage from impacting an authentic object when a counterfeit object shows up far outside of its intended geographic region. The central authentication server may also indicate that the verification request is unconfirmed (1845), for example using a verification tag. The central authentication server may then store the data for the verification request, e.g., the velocity, the authenticity probability, etc., and return the authenticity probability and any other relevant data or messages (1860). Process 1800 is then complete for this verification request.

If the velocity threshold has not been reached (1825, No), the central authentication server may determine whether a security ratio threshold is reached (1835). In other words, even if the velocity threshold is not met, it still may come undesirably close. The security ratio threshold is a value that the manufacturer sets, and may be for a particular class of product, for a particular Pollux Pair, or for the manufacturer. The security ratio threshold may be met by one of two security ratios. A request security ratio represents a ratio of a verification request's velocity to the velocity threshold, e.g., from step 1825. An average security ratio represents a ratio of the average of the velocities over all previous consecutive unconfirmed verification requests with respect to the velocity threshold. Using the average security ratio assists in tracking the movements of a Pollux Pair. Thus, if either the request security ratio or the average security ratio exceeds the security ratio threshold (1835, Yes), the central authentication server may set the authenticity probability for the current verification request to a value that represents a slight penalty on the authenticity (1840). For example, the central authentication server may adjust a highest likelihood of authenticity by a slight penalty factor. For example, the central authentication server may divide the highest likelihood of authenticity by the number of consecutive unconfirmed verification requests, including the current verification request, plus one. In other words, on the first unconfirmed verification request, the system may divide the highest likelihood of authenticity by 1+1 (i.e., the current verification request plus one) to calculate the probability. The next time, the highest likelihood of authenticity may be divided by 2+1, etc. Thus, the system decrements the authenticity probability in such a way that it causes a sharp drop upon the first unconfirmed verification and gradually levels off to a smaller decrementation after many unconfirmed verifications. The central authentication server may also indicate that the verification request is unconfirmed (1845). The central authentication server may then store the data for the verification request, e.g., the velocity, the authenticity probability, etc., and return the authenticity probability and any other relevant data or messages (1860). Process 1800 is then complete for this verification request.

If the security ratio threshold is not met (1835, No), the central authentication server may determine that the request is successful and set the authenticity probability to a value representing a highest likelihood that the product is authentic (1850). For example, in some implementations, the central authentication server may set the authentication to 1.00 where 1.00 represents the highest likelihood. The central authentication server may then store the data for the verification request, e.g., the velocity, the authenticity probability, etc., and return the authenticity probability and any other relevant data or messages (1860). Process 1800 is then complete for this verification request.

In some cases, a product's owner may not have registered as the Pollux Pair verification owner and may have carried the host product outside its secure velocity limits. As a result, the product owner then might not be able to escape a series of unconfirmed requests and the resultant penalization of his or her product's authenticity probability. To address this scenario, the central authentication server may provide for a request for verification ownership, where a user may submit a request to the central authentication server to become the verification owner of said Pollux Pair. If the original manufacturer allows for such requests to be submitted during the product's lifespan, the central authentication server will then receive the request and wait for several more verification requests to accumulate. Assuming no other more preferable time-location requests occur within that series of requests (which would void the ownership request), the central authentication server may add the requestor's identification as the verification owner for that Pollux Pair, providing the product owner with all the privileges accompanying that designation.

Process 1800 provides flexibility between verification requests in different phases of an origin-pattern-affixed product's life. Strict time and location constraints may be imposed during production, shipping, and sales operations, which may then be relaxed to velocity constraints and security ratios thereafter. Over time, as patterns for Pollux Pair verifications are established for different types or instances of products, security ratio thresholds may also be refined or converge to tighter values. Another advantage of some implementations is the ability to decentralize the inspection and verification of the fingerprints that are included in the Pollux Pair. The result of the verification process can be a semi-distributed security network, which is constantly reinforced by information arriving to the network hub (e.g., the central authentication server) from the network fringe (e.g., public, free-of-charge mobile client or smartphone application). The empowerment of all individuals in the public through this method vastly reduces the likelihood of counterfeit product acceptance, as well as the time and resources spent by the manufacturer on developing, providing, and enforcing anti-counterfeiting measures.

In some implementations, the independent, distributed inspectors can be incentivized to frequently send verification requests in order to maximize such network reinforcement. Pollux Pair verification could be easily 'gamified' by awarding points to each inspector based on the number (and degree of authenticity probability) of Pollux Pairs verified by the inspector. Those points could then be redeemable for coupons, discounts, or other prizes from the operator of the central authentication server or the manufacturer whom those Pollux Pairs belong to. Reaching higher 'levels' of product inspection status could serve as an easy standard for determining when rewards should be given to inspectors, and could take exponentially longer to reach as rewards increase in value.

A discussion of the robustness of the authentication process follows. The discussion assumes the existence of a Pollux Pair on a manufactured part that a counterfeiter may wish to pirate. If the counterfeiter creates a false Pollux Pair from scratch, it should be expected that pirated goods will one day exhibit fraudulent Pollux Pairs that are indistinguishable from valid Pollux Pairs to the naked eye. However, given the near-ubiquitous distribution of mobile computing devices, such as smartphones, in developed and developing countries, such false Pollux Pair is quickly discovered by a properly-equipped consumer because a corresponding DSSN will not be found. If a counterfeiter creates a counterfeited product with no Pollux Pair, the manufacturer may build a strong brand security recognition (i.e., by exhibiting and promoting the new security scheme featured on all its products), allowing the average consumer to look for the Pollux Pair and reject a product without one.

A counterfeiter may attempt to 'reverse-engineer' a valid Pollux Pair. For example, a counterfeiter may examine the DSSN and the pattern composing the Pollux Pair on an authentic product and hope to crack the generation methodology in order to then scam the central authentication server into believing new, supposedly valid host objects are being created. But due to the cryptographic nature of the Pollux Pair, the chances of an attacker successfully generating a Pollux Pair that passes the verification tests are immeasurably small. Finally, if a counterfeiter reproduces an existing Pollux Pair with enough accuracy to pass the first two validation tests, the semi-distributed verification network protects against such forgeries, since the lowest-effort option for the counterfeiter would be to scan only one or a handful of valid products and churn out many forgeries. Once the TLST entries for the single (or several) products begin to diverge and decrease in probability of being valid Pollux Pairs, the counterfeit items are far less likely to be accepted. Such a discrepancy can be detected quickly and in some cases even reversed, where the security scheme is able to remotely determine which object is authentic (if a pattern of TLST entries is more consistent than its conflicting entries). This is especially true if TLST entries are well-maintained as inspectors act on incentives to regularly verify Pollux Pairs they encounter.

An object authentication system using the origin pattern described above has versatility in addition to resilience. A single manufacturer can design, fabricate, and distribute products independently and protect those products with Pollux Pairs. But the same manufacturer can also authorize other manufacturers to handle specific tasks within that process while still providing a verifiable chain of ownership. A wide variety of products can be protected using this scheme, as well, due to the range of strict or probabilistic constraints during the verification process. An authentication system that incentivizes distributed verification and offers a high level of security robustness such as this is highly preferable to current anti-counterfeiting systems that fail to meet the needs of the manufacturer, the consumer, or both.

In one aspect, a method of authenticating an object includes generating a serial number component of an origin pattern and generating a surface-texture component of the origin pattern. The serial number component includes a public manufacturer identifier and a product identifier sequence that is based on a hash of a private identifier for a manufacturer and a private identifier for the object. The surface-texture component is a based on manipulation of computer graphics objects using the hash of the private identifier for the manufacturer and the private identifier for the object. The method also includes storing the hash and the serial number component in a data store and providing the origin pattern to the manufacturer, the manufacturer affixing the origin pattern to the object.

In addition, the method may also include receiving a verification request, the verification request including a serial number component, determining whether the serial number from the verification request exists in the data store, and providing an indication that the verification request failed when the scanned serial number does not exist in the data store. In addition or alternatively, the method may include receiving a verification request, the verification request including a serial number component obtained from a test object and a time-location stamp, determining that the serial number from the test object exists in the data store, receiving an image of a surface-texture component on the test object, and generating a challenge surface-texture component based on information in the data store stored with the serial number from the test object. In such implementations, the method may also include determining that the surface-texture component from the test object matches the challenge surface-texture component, determining whether the time-location stamp is outside constraints set by the manufacturer, and providing an indication that the verification request failed when the time-location stamp is outside the constraints.

In addition or alternatively, the method may include receiving a verification request from a requestor, the verification request including a serial number component obtained from a test object and a time-location stamp, verifying that the serial number component from the test object exists in the data store and that a surface-texture component on the test object matches a challenge surface-texture component generated based on information in the data store stored with the serial number from the test object, assigning an authenticity probability to the verification request based on the time-location stamp; and returning the authenticity probability for the test object to the requestor. In additional or alternatively, the method may include receiving a verification request from a requestor, the verification request including a serial number component obtained from a test object and a time-location stamp, verifying whether the serial number component obtained from the test object exists in the data store and whether a surface-texture component on the test object matches a challenge surface-texture component generated based on information in the data store stored with the serial number obtained from the test object, and providing a reward to the requestor of the verification request.

In addition or alternatively, the serial number component can include a chain of ownership identifier and the product identifier sequence is based on a hash of the private identifier for the manufacturer, the private identifier for the object, and the chain of ownership identifier. In some implementations, the method may also include receiving a verification request from a requestor, the verification request including a serial number component obtained from a test object and a time-location stamp, verifying that the serial number component obtained from the test object exists in the data store and that a surface-texture component on the test object matches a challenge surface-texture component generated based on information in the data store stored with the serial number obtained from the test object; using the chain of ownership identifier to determine whether a valid chain of ownership for the test object exists, and providing an indication that the verification request failed when a valid chain of ownership does not exist. In some implementations, the method may also include receiving a verification request from a requestor, the verification request including a serial number component obtained from a test object and a time-location stamp, verifying that the serial number component obtained from the test object exists in the data store and that a surface-texture component on the test object matches a challenge surface-texture component generated based on information in the data store stored with the scanned serial number, using the chain of ownership identifier to determine whether a valid chain of ownership for the test object exists, and providing an indication that the verification request failed when a valid chain of ownership does not exist.

In addition or alternatively, the method may include receiving a verification owner identifier for the origin pattern, storing the verification owner identifier with the hash and the serial number component in the data store, receiving a verification request from a requestor, the verification request including a serial number component obtained from an origin pattern on a test object and a requestor identifier, verifying that the serial number component obtained from the origin pattern on the test object exists in the data store and that a surface-texture component of the origin pattern on the object matches a challenge surface-texture component generated based on information in the data store stored with the serial number obtained from the test object, determining that the requestor identifier matches the verification owner identifier, and providing an indication that the verification request succeeded responsive to determining that the requestor identifier matches.

In another aspect a system includes at least one processor and memory storing instructions that, when executed by the at least one processor, cause the system to perform operations. The operations include generating a first hash of a private manufacturer identifier, a product identifier, and a chain of ownership identifier, generating a three-dimensional surface using a first portion of the first hash, generating a texture pattern using a last portion of the first hash, and generating a surface-texture component of an origin pattern by mapping the texture pattern onto the three-dimensional surface. The operations also include generating a serial number component of the origin pattern, the serial number component including a public manufacturer identifier and a product identifier sequence that is based on the first hash and the public manufacturer identifier and providing the origin pattern for imprinting on the product.

In some implementations, the origin pattern may be provided as a computer-aided design image. In some implementations, the chain of ownership identifier may be either null or a valid public manufacturer identifier for a second manufacturer.

In addition or alternatively, the system may include a data store that stores information for the origin pattern, the information including the first hash, the public manufacturer identifier, the product identifier sequence, a three-dimensional set of random numbers, and a two-dimensional set of random numbers. The three-dimensional set of random numbers may be used to transform control vertices of the three-dimensional surface as part of generating the three-dimensional surface, and the two-dimensional set of random numbers may be used to transform control vertices of the texture pattern as part of generating the texture pattern.

In another aspect, a method of authenticating a product with an origin pattern includes receiving an authentication request from a requestor, the authentication request including a serial number component from the origin pattern and a time-location stamp, and determining that the serial number component exists in a data store, the data store including a hash of a private manufacturer identifier and a private object identifier for the serial number. The method also includes receiving an image of a surface-texture component of the origin pattern, determining that the surface-texture component in the image matches a challenge surface-texture component generated based on the hash, and determining an authenticity probability based on the time-location stamp. The method may also include storing the authenticity probability and the time-location stamp in the data store; and providing an indication of authenticity based on the authenticity probability.

In some implementations, determining the authenticity probability includes determining a distance for the product based on a location of the time-location stamp and a location of a previous verification request, determining a time between the time of the time-location stamp and a time of the previous verification request, determining a velocity based on the distance and the time; and calculating the authenticity probability by applying a severe penalty factor to an authenticity probability of the previous verification request when the velocity meets a velocity threshold. In addition, determining the authenticity probability may include determining that the velocity fails to meet the velocity threshold and calculating the authenticity probability by applying a slight penalty factor to the authenticity probability of the previous verification request when a ratio of the velocity to the velocity threshold meets a security ratio threshold. In addition or alternatively, determining the authenticity probability may include determining that the velocity fails to meet the velocity threshold and setting the authenticity probability to a value representing a highest likelihood of authenticity when a ratio of the velocity to the velocity threshold fails to meet a security ratio threshold. In addition or alternatively, determining the authenticity probability may include determining that the velocity fails to meet the velocity threshold and storing an indication, with the time-location stamp and the authenticity probability, that the authentication request is unconfirmed when the velocity meets the velocity threshold. In addition or alternatively, determining the authenticity probability may include determining that the velocity fails to meet the velocity threshold, calculating an average velocity over each previous consecutive unconfirmed verification requests, and calculating the authenticity probability by applying a slight penalty factor to a highest likelihood of authenticity when a ratio of the average velocity to the velocity threshold meets a security ratio threshold.

In some implementations, determining the authenticity probability may include determining whether a requestor identifier matches a verification owner for the origin pattern and setting the authenticity probability to a value representing a highest likelihood of authenticity when the requester identifier matches the verification owner. In addition or alternatively, the authenticity probability is a first authenticity probability and the method also includes receiving a request for verification ownership associated with a requestor identifier, receiving a series of authentication requests subsequent to receiving the request for verification ownership, determining that the series of authentication requests do not include a more preferable authenticity probability than the first authenticity probability, and setting a verification owner for the origin pattern to the requestor identifier.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the disclosure.

What is claimed is:

1. A method of authenticating an object, comprising:
    generating a serial number component of an origin pattern, the serial number component including a product identifier sequence that is based on a hash of a private identifier;
    generating a surface-texture component of the origin pattern, the surface-texture component being based on the hash of the private identifier;
    storing the hash and the serial number component in a data store;
    providing the origin pattern to a manufacturer of the object, the manufacturer affixing the origin pattern to the object;
    receiving a verification request from a requestor, the verification request including a serial number component from a test object and a time-location stamp;
    verifying that the serial number component from the test object exists in the data store and that a surface-texture component on the test object matches a challenge surface-texture component generated based on information in the data store stored with the serial number from the test object;
    calculating a numerical authentication probability for the verification request based on a velocity determined using the time-location stamp by:
        determining the velocity as a distance per unit of time between time-location stamps of consecutive verification requests for the serial number component,
        determining whether the velocity for the test object has reached a velocity threshold, and
        setting the numerical authentication probability based on a penalty applied to a previous numerical authentication probability for the serial number component responsive to the velocity reaching the velocity threshold; and
    providing an indication of the numerical authentication probability to the requestor.

2. The method of claim 1, wherein calculating the numerical authentication probability includes using a highest likelihood of authenticity to calculate the authentication probability.

3. The method of claim 1, further comprising:
    receiving a time-location constraint for the serial number component from the manufacturer,
    determining whether the time-location stamp is outside the time-location constraint; and
    setting the numerical authentication probability to unconfirmed responsive to determining the time-location stamp is outside the constraint.

4. The method of claim 1, further comprising:
    storing the numerical authentication probability and the time-location stamp in the data store as a past verification request.

5. The method of claim 1, further comprising:
    providing a reward to the requestor of the verification request.

6. The method of claim 1, wherein the serial number component includes a chain of ownership identifier and a public manufacturer identifier and the product identifier sequence is based on a hash of the private identifier for the manufacturer, the private identifier for the object, and the chain of ownership identifier.

7. The method of claim 1, wherein the velocity threshold is set by the manufacturer.

8. The method of claim 1, further comprising:
    using a chain of ownership identifier to determine whether a valid chain of ownership for the test object exists, the chain of ownership identifier being associated with the serial number; and
    providing an indication that the verification request failed responsive to determining a valid chain of ownership does not exist.

9. The method of claim 1, wherein the verification request includes a requestor identifier and the method further comprises:
    receiving a verification owner identifier for the origin pattern;
    storing the verification owner identifier with the hash and the serial number component in the data store; and
    determining that the requestor identifier matches the verification owner identifier,
    wherein calculating the numerical authentication probability includes setting the probability to a highest probability regardless of the velocity responsive to determining that the requestor identifier matches.

10. A system comprising:
   at least one processor;
   a data store that stores information for respective origin patterns for products, the information for a respective origin pattern of a product including a hash and a serial number component for the respective origin pattern; and
   memory storing instructions that, when executed by the at least one processor, cause the system to:
      generate a first hash of a product identifier;
      generate a serial number component of an origin pattern, the serial number component including a product identifier sequence that is based the first hash;
      generate a challenge component of the origin pattern, the challenge component being based on the hash of the product identifier;
      store the hash and the serial number component in the data store;
      provide the origin pattern for imprinting on a product;
      receive a verification request from a requestor, the verification request including a serial number component obtained from a test object and a time-location stamp;
      verify that the serial number component obtained from the origin pattern on the test object exists in the data store and that a surface-texture component of the origin pattern on the object matches a surface-texture component generated using information in the data store associated with the serial number obtained from the test object;
      calculate an authentication probability for the verification request based on a velocity determined using the time-location stamp by:
         determining whether the velocity satisfies a velocity threshold,
         responsive to the velocity failing to satisfy the velocity threshold, using a highest likelihood of authenticity to calculate the authentication probability, and
         responsive to the velocity satisfying the velocity threshold using a penalty applied to a previous authenticity probability from a previous verification request to calculate the authentication probability; and
      provide an indication of the authentication probability to the requestor.

11. The system of claim 10, wherein the velocity is a measure of distance per unit of time.

12. The system of claim 10, wherein determining whether the velocity fails to satisfy the velocity threshold includes determining whether a prior verification request exists and, responsive to determining that no prior verification request exists, determining the velocity threshold is not satisfied.

13. The system of claim 10, wherein using a highest likelihood of authenticity to calculate the authentication probability includes:
   determining a security ratio for the request;
   determining whether the a security ratio satisfies a security ratio threshold;
   setting the authentication probability to the highest likelihood responsive to determining the security ratio satisfies the security ratio threshold; and
   setting the authentication probability to the highest likelihood of authenticity adjusted by a penalty factor.

14. The system of claim 13, wherein the security ratio threshold is set by a manufacturer of the product.

15. The system of claim 10, wherein the memory further stores instructions that, when executed by the at least one processor, cause the system to:
   determine whether a minimum time has been reached since the previous verification request; and
   calculate the authentication probability responsive to determining the minimum time has been reached.

16. The system of claim 10, wherein the memory further stores instructions that, when executed by the at least one processor, cause the system to:
   receive a verification owner identifier for the origin pattern;
   store the verification owner identifier with the hash and the serial number component in the data store;
   determine that a requestor identifier received with the verification request matches the verification owner identifier; and
   set the authentication probability to a highest likelihood of authenticity responsive to determining that the requestor identifier matches.

17. A system comprising:
   at least one processor;
   a data store that stores information for respective origin patterns for products, the information for a respective origin pattern of a product including a hash, a serial number component for the respective origin pattern, and manufacturer constraints that apply to the products, the manufacturer constraints including a velocity threshold; and
   memory storing instructions that, when executed by the at least one processor, cause the system to:
      receive a verification request, the verification request including a serial number component obtained from a test object and a time-location stamp;
      determine that the serial number from the test object exists in the data store and that a challenge component obtained from the test object matches a challenge component generated from information in the data store stored with the serial number from the test object;
      determine whether a minimum wait time has been reached since a previous verification request; and
      responsive to the minimum wait time being reached:
         set an authenticity probability for the serial number component to a value indicating inauthenticity responsive to determining the time-location stamp is outside the constraint,
         calculate an authenticity probability for the serial number component based on a velocity determined using the time-location stamp responsive to determining the time-location stamp is not outside the constraint, and
         store the authenticity probability with the time-location stamp for the serial number component.

18. The system of claim 17, wherein the memory further stores instructions that, when executed by the at least one processor, cause the system to:
   responsive to determining the minimum wait time has not been reached, provide a response that lacks an indication of whether the object is authentic.

19. The system of claim 17, wherein the constraint is a distance per time constraint from which a location of a verification request for the product can be determined valid or invalid.

20. The system of claim 17, wherein the constraint is a time constraint indicating a time period outside which a verification request for the product will fail.

* * * * *